United States Patent
Kadiri et al.

(10) Patent No.: US 11,330,478 B2
(45) Date of Patent: May 10, 2022

(54) IDLE CELL RESELECTION AND USER EQUIPMENT CAPABILITY SIGNALING

(71) Applicant: QUALCOMM Incorporated, San Diego, CA (US)

(72) Inventors: Prasad Reddy Kadiri, San Diego, CA (US); Haris Zisimopoulos, London (GB); Alberto Rico Alvarino, San Diego, CA (US); Mungal Singh Dhanda, Slough (GB); Amer Catovic, Carlsbad, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 16/532,195

(22) Filed: Aug. 5, 2019

(65) Prior Publication Data

US 2020/0053602 A1 Feb. 13, 2020

(30) Foreign Application Priority Data

Aug. 10, 2018 (GR) .............................. 20180100381

(51) Int. Cl.
*H04B 7/00* (2006.01)
*H04W 36/00* (2009.01)
(Continued)

(52) U.S. Cl.
CPC ......... *H04W 36/0022* (2013.01); *H04W 4/80* (2018.02); *H04W 8/24* (2013.01); *H04W 36/0058* (2018.08); *H04W 36/08* (2013.01)

(58) Field of Classification Search
CPC ..... H04W 48/16; H04W 48/18; H04W 48/20; H04W 76/046; H04W 88/06;
(Continued)

(56) References Cited

U.S. PATENT DOCUMENTS 7,996,010 B2 * 8/2011 Farnsworth ........... H04W 36/12
455/436
8,706,115 B2 * 4/2014 Pani .................. H04W 36/0083
455/436

(Continued)

FOREIGN PATENT DOCUMENTS

| EP | 3198942 A2 | 8/2017 |
| GB | 2475094 A | 5/2011 |
| WO | WO-2011107886 A1 | 9/2011 |

OTHER PUBLICATIONS

"3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2 (Release 15)", 3GPP Standard, Technical Specification, 3GPP TS 36.300, 3rd Generation Partnership Project (3GPP), Mobile Competence Centre, 650, Route Des Lucioles, F-06921 Sophia-Antipolis Cedex, France, vol. RAN WG2, No. V15.2.0, Jul. 7, 2018 (Jul. 7, 2018), XP051474841, pp. 1-357, [retrieved on Jul. 7, 2018], paragraph 10.2.1 paragraph 16.1.8 paragraph 18 Figure 18-1 Annex I.

(Continued)

*Primary Examiner* — Dmitry Levitan
(74) *Attorney, Agent, or Firm* — Holland & Hart LLP

(57) ABSTRACT

Methods, systems, and devices for wireless communications are described. A user equipment (UE) may determine a UE capability for available radio access technologies. The UE may determine which of the available radio access technologies are suitable for idle cell reselection (e.g., inter-radio access technology idle cell reselection, intra-radio access technology idle cell reselection) according to the UE capabilities, which may be related to a UE category or UE usage mode (e.g., voice centric mode, data centric mode) of the UE, etc. The UE may transmit a signal indicating the UE capabilities to a network entity (e.g., a serving cell). The (Continued)

network entity may receive the signaling and determine suitable radio access technologies for the idle cell reselection, and transmit a set of parameters in a message for the UE to use as part of the idle cell reselection.

21 Claims, 15 Drawing Sheets

(51) Int. Cl.
*H04W 36/08* (2009.01)
*H04W 4/80* (2018.01)
*H04W 8/24* (2009.01)

(58) Field of Classification Search
CPC ......... H04W 88/12; H04W 4/02; H04W 4/18; H04W 4/20; H04W 16/24; H04W 36/0066; H04W 36/08
USPC ................................ 370/310, 328, 331, 332
See application file for complete search history.

(56) References Cited

U.S. PATENT DOCUMENTS

| | | | | |
|---|---|---|---|---|
| 9,301,301 | B2* | 3/2016 | Aumann | H04W 16/02 |
| 9,462,523 | B2* | 10/2016 | Zisimopoulos | H04W 8/22 |
| 9,756,531 | B2* | 9/2017 | Park | H04W 76/15 |
| 9,807,679 | B2* | 10/2017 | Gupta | H04W 48/14 |
| 9,888,415 | B1* | 2/2018 | Govindassamy | H04W 36/0094 |
| 10,448,276 | B2* | 10/2019 | Chun | H04L 41/0681 |
| 10,660,029 | B2* | 5/2020 | Zaus | H04W 8/22 |
| 10,779,223 | B2* | 9/2020 | Yang | H04W 4/70 |
| 10,868,658 | B2* | 12/2020 | Yi | H04W 72/0446 |
| 2008/0227453 | A1* | 9/2008 | Somasundaram | H04W 48/20 455/436 |
| 2015/0264637 | A1* | 9/2015 | Zaus | H04W 8/22 455/434 |
| 2017/0048647 | A1* | 2/2017 | Jung | H04W 72/04 |
| 2019/0028887 | A1* | 1/2019 | Ryu | H04W 8/20 |
| 2020/0053602 | A1* | 2/2020 | Kadiri | H04W 36/0058 |
| 2020/0084694 | A1* | 3/2020 | Kim | H04W 48/08 |
| 2020/0112969 | A1* | 4/2020 | Dai | H04W 72/10 |
| 2020/0396654 | A1* | 12/2020 | Freda | H04W 36/06 |

OTHER PUBLICATIONS

"3rd Generation Partnership Project, Technical Specification Group Radio Access Network, Evolved Universal Terrestrial Radio Access (E-UTRA), Radio Resource Control (RRC), Protocol Specification (Release 15)", 3GPP Standard, Technical Specification, 3GPP TS 36.331, 3rd Generation Partnership Project (3GPP), Mobile Competence Centre, 650, Route Des Lucioles, F-06921 Sophia-Antipolis Cedex, France, vol. RAN WG2, No. V15.2.2, Jul. 10, 2018 (Jul. 10, 2018), XP051474963, pp. 1-791, [retrieved on Jul. 10, 2018], paragraph 5.6.3 p. 537-p. 581 p. 649.

International Search Report and Written Opinion—PCT/US2019/045542—Isa/Epo—dated Feb. 7, 2020 (184479WO).

3rd Generation Partnership Project; Technical Specification Group Core Network and Terminals; Non-Access-Stratum (NAS) Protocol for Evolved Packet System (EPS); Stage 3 (Release 15), 3GPP Standard; Technical Specification; 3GPP TS 24.301, 3rd Generation Partnership Project (3GPP), Mobile Competence Centre; 650, Route Des Lucioles; F-06921 Sophia-Antipolis Cedex; France, vol. CT WG1, No. V15.3.0, Jun. 21, 2018, pp. 1-528, XP051472967, [retrieved on Jun. 21, 2018] paragraph 4.3.1 paragraph 4.3.2 paragraph 4.5 Table 4.3.2.2.2.

3rd Generation Partnership Project; Technical Specification Group Radio Access Network; Evolved Universal Terrestrial Radio Access (E-UTRA); User Equipment (UE) Procedures in Idle Mode (Release 15), 3GPP Standard; Technical Specification; 3GPP TS 36.304, 3rd Generation Partnership Project (3GPP), Mobile Competence Centre; 650, Route Des Lucioles; F-06921 Sophia-Antipolis Cedex; France, vol. RAN WG2, No. V15.0.0, Jul. 6, 2018, pp. 1-52, XP051474807, [retrieved on Jul. 6, 2018] paragraph 5.2.

3rd Generation Partnership Project; Technical Specification Group Services and System Aspects; General Packet Radio Service (GPRS) Enhancements for Evolved Universal Terrestrial Radio Access Network (E-UTRAN) Access (Release 15), 3GPP Standard; Technical Specification; 3GPP TS 23.401, 3rd Generation Partnership Project (3GPP), Mobile Competence Centre; 650, Route Des Lucioles; F-06921 Sophia-Antipolis Cedex; France, vol. SA WG2, No. V15.4.0, Jun. 19, 2018, pp. 1-410, XP051472859, [retrieved on Jun. 19, 2018] paragraph 5.11.2.

Partial International Search Report—PCT/US2019/045542—ISA/EPO—dated Nov. 8, 2019 (184479WO).

* cited by examiner

IDLE CELL RESELECTION AND USER EQUIPMENT CAPABILITY SIGNALING

CROSS REFERENCE

The present Application for Patent claims the benefit of Greece Provisional Patent Application No. 20180100381 by KADIRI et al., entitled "IDLE CELL RESELECTION AND USER EQUIPMENT CAPABILITY SIGNALING," filed Aug. 10, 2018, assigned to the assignee hereof, and expressly incorporated herein.

BACKGROUND

The following relates generally to wireless communications, and more specifically to idle cell reselection and user equipment (UE) capability signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations, each simultaneously supporting communication for multiple communication devices, which may be otherwise known as UEs. Each base station may have a coverage area, which may be referred to herein as a cell of the base station. In some examples, the wireless multiple-access communications system may have cells that use different radio access technologies (e.g., Global System for Mobile Communications (GSM), Universal Mobile Telecommunications Service (UMTS), 4G LTE, 5G NR), as well as UEs supporting multiple radio access technologies. A UE may perform an idle cell reselection procedure (e.g., inter-radio access technology idle cell reselection, intra-radio access technology idle cell reselection) to switch cells (e.g., to a neighboring cell) after the UE has camped on a cell and has remained in an IDLE mode. In some cases, however, certain radio access technologies may be unsuitable for a UE capability.

SUMMARY

The described techniques relate to improved methods, systems, devices, and apparatuses that support idle cell reselection and user equipment (UE) capability signaling. A UE may determine a UE capability for available radio access technologies. The UE may determine which of the available radio access technologies are suitable for idle cell reselection (e.g., inter-radio access technology idle cell reselection, intra-radio access technology idle cell reselection) according to the UE capabilities, which may be related to a UE category or UE usage mode (e.g., voice centric mode or data centric mode, or any other mode) of the UE, etc. In some cases, the UE may transmit a signal indicating the UE capabilities to a network entity (e.g., a serving cell, a mobility management entity (MME)) in wireless communications with the UE based on the UE capabilities. The network entity may receive the signaling and determine suitable radio access technologies for idle cell reselection (e.g., inter-radio access technology idle cell reselection procedure, intra-radio access technology idle cell reselection procedure), and transmit a set of parameters in a message for the UE to use as part of the idle cell reselection.

DETAILED DESCRIPTION

A user equipment (UE) may determine a UE capability for available radio access technologies such as, narrowband Internet-of-Things (NB-IoT) Long Term Evolution (LTE), evolved machine-type communications (eMTC), a global system for mobile communications (GSM) and enhanced data rates for GSM evolution (EDGE) radio access network (GERAN), among others. The UE may determine which of the available radio access technologies are suitable for idle cell reselection (e.g., inter-radio access technology idle cell reselection, intra-radio access technology idle cell reselection) according to the UE capabilities, which may be related to a UE category or UE usage mode (e.g., voice centric mode or data centric mode, or any other mode) of the UE, etc. In some cases, the UE may transmit a signal (e.g., dedicated-signaling, radio resource control (RRC) signaling) indicating the UE capabilities to a network entity (e.g., a serving cell of the UE).

The network entity may receive the signaling and determine suitable radio access technologies for idle cell reselection (e.g., inter-radio access technology idle cell reselection procedure, intra-radio access technology idle cell reselection procedure), and transmit a set of parameters in a message for the UE to use as part of the idle cell reselection. That is, certain radio access technologies may be unsuitable for a UE capability. Therefore, it may be advantageous for the network entity to support determination of suitable radio access technologies for an idle cell reselection procedure (e.g., inter-radio access technology idle cell reselection, intra-radio access technology idle cell reselection) for the UE according to the UE capability, UE category, or UE usage mode, or a combination thereof. As a result, providing greater diversity in a wireless communications system.

As used herein, the term radio access technology may refer to a system, device, method, or process that corresponds to or implements communications for a specific protocol, communication standard, or a version of a protocol or communication standard in order to access communication services provided by a communication network, such as a core network. Different radio access technologies may implement aspects that are similar but differ in one or more aspects as indicated by their respective protocols, communication standards, and/or versions.

Aspects of the disclosure are initially described in the context of a wireless communications system. Aspects of the disclosure are then described in the context of a process flow. Aspects of the disclosure are further illustrated by and described with reference to apparatus diagrams, system diagrams, and flowcharts that relate to idle cell reselection and user equipment capability signaling.

Figure 1:
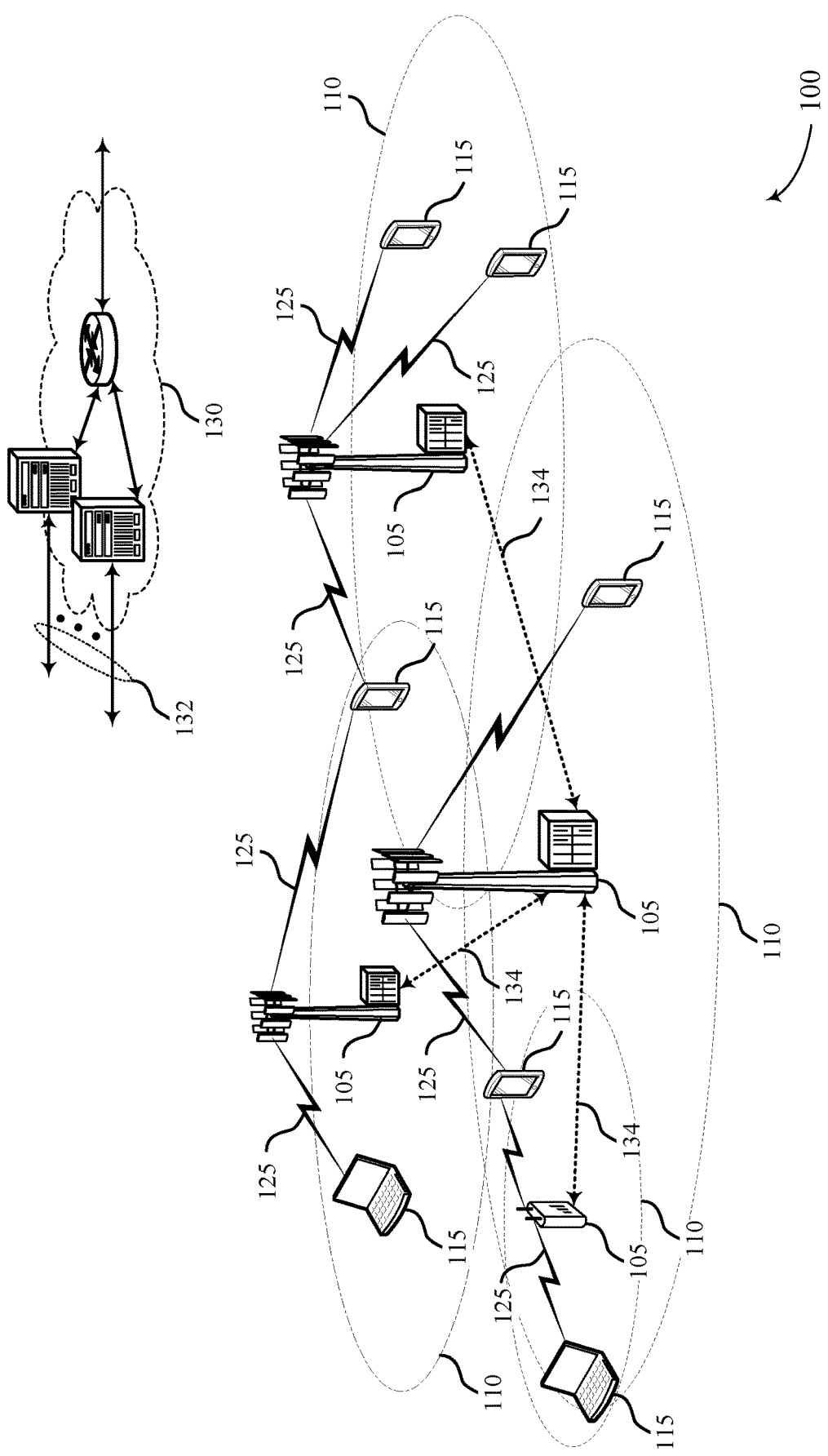
FIGS. 1 and 2 illustrate examples of a wireless communications system that supports idle cell reselection and user equipment (UE) capability signaling in accordance with aspects of the present disclosure.

FIG. 1 illustrates an example of a wireless communications system 100 that supports idle cell reselection and UE capability signaling in accordance with aspects of the present disclosure. The wireless communications system 100 includes base stations 105, UEs 115, and a core network 130. In some examples, the wireless communications system 100 may be a fourth generation (4G) LTE network, an LTE-Advanced (LTE-A) network, an LTE-A Pro network, or a fifth generation (5G) New Radio (NR) network. In some cases, the wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in the wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. As such, geographic coverage area 110 may also be referred to herein as a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), NB-IoT, enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. In some cases, UEs 115 may perform a cell selection procedure or an idle cell reselection procedure, or both. As part of the cell selection procedure, UEs 115 may select a public land mobile network and optionally a closed subscriber group for registration. After selecting the public land mobile network or the closed subscriber group, UEs 115 may select a cell that belongs to the selected public land mobile network and if necessary, to the selected closed subscriber group. For example, a UE 115 may select a cell belonging to a base station 105 included in the public land mobile network and covering a portion of a geographic coverage area 110. The selected cell may be referred to herein as a serving cell. Therein, the UE 115 may be referred to as camping on the cell belonging to the base station 105. While camping on a selected cell, UEs 115 may initiate a connection procedure (e.g., a radio resource control (RRC) connection establishment procedure) with a base station 105 associated with the selected cell.

During the connection procedure, UEs 115 may establish a signaling connection with the base station 105 associated with the selected cell, and move from an IDLE mode (e.g., RRC-IDLE) to a CONNECTED mode (e.g., RRC-CONNECTED). The UEs 115 may also acquire a set of parameters through which UEs 115 can communicate with the base station 105 associated with the selected cell. UEs 115 may remain in the CONNECTED mode as long as their exchanging information (e.g., data) with the public land mobile network (e.g., via base station 105 associated with the selected cell). If UEs 115 cease exchanging information, the public land mobile (e.g., via base station 105 associated with the selected cell) can transfer the UEs 115 from the CONNECTED mode to the IDLE mode (e.g., via S1 release procedure). Following the connection procedure, UEs 115 may communicate with an evolved packet core (EPC) network (e.g., core network 130) to register their geographical location with a mobility management entity (MME) (e.g., via an attach procedure).

With reference to the idle cell reselection procedure, UEs 115 may switch from the selected cell to a non-serving cell (e.g., a neighboring cell) after UEs 115 have been camping on the selected cell and remain in IDLE mode. As part of the idle cell reselection procedure, UEs 115 may receive system information blocks carrying cell reselection criteria for idle cell reselection, and perform measurements on non-serving cells according to the cell reselection criteria (e.g., cell-priority criterion, cell-rank criterion). Upon identifying a non-serving cell satisfying a cell reselection criterion, UEs 115 may perform the connection procedure with the non-serving cell, and a connection release procedure with the serving cell. As a result, the non-serving cell becomes the serving cell.

A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some examples, UEs 115 may support enhanced broadband communications, ultra-reliable (e.g., mission critical) communications, low latency communications, or communications with low-cost and low-complexity devices. For example, an NB-IoT capable UE may operate according to at least one category including: category NB1 supporting low data rates, low mobility, etc., or category NB2 supporting positioning and single-cell multicast, as well as reduced power consumption. An NB-IoT capable UE may use a smaller portion of a system bandwidth (e.g., 180 kHz channel bandwidth) compared to other legacy UEs. In some cases, an NB-IoT capable UE may use a narrowband system information block.

An NB-IoT capable UE may determine that a signal quality of a serving cell deployed at the NB-IoT capable UE satisfies a cell measurement criterion. An NB-IoT capable UE may perform cell selection to identify and select a suitable cell that belongs to a selected network and, if necessary, to a selected closed subscriber group. In some cases, the NB-IoT capable UE may access stored information about frequencies and cells. If this information is unavailable, then the NB-IoT capable UE may scan all frequencies that it supports and identify a strongest cell on each frequency that belongs to the selected network. A suitable cell may be a cell that satisfies several criteria such as, a cell selection criterion Srxiev being greater than zero ($S_{rxlev}>0$). The NB-IoT capable UE may determine the cell selection criterion $S_{rxlev}$ as follows:

$$S_{rxlev}=Q_{rxlevmeas}-Q_{rxlevmin}-P_{compensation}-Q_{offsettemp} \quad (1)$$

In this equation, $Q_{rxlevmeas}$ may be the cell's narrowband reference signal received power, which is the average power per resource element that the NB-IoT capable UE is receiving on the cell-specific reference signals. $Q_{rxlevmin}$ may be a minimum value for the cell's narrowband reference signal received power, which a base station 105 (e.g., of a cell the NB-IoT is camping on) may advertise in a system information block (e.g., system information block-1). The $Q_{offsettemp}$ may be an offset applied temporarily to a cell. These parameters (e.g., $Q_{rxlevmeas}$, $Q_{rxlevmin}$, $Q_{offsettemp}$) may ensure that the NB-IoT capable UE selects a cell in which the base station's transmissions on are received on the downlink.

The NB-IoT capable UE may determine the $P_{compensation}$ as follows:

$$P_{compensation}=\max(P_{EMAX}-P_{POWERCLASS},0) \quad (2)$$

Here, $P_{EMAX}$ may be an upper limit on the transmit power that the NB-IoT capable UE is allowed to use, which a base station 105 (e.g., of a cell the on which the NB-IoT is camping) may advertise as part of a system information block (e.g., system information block-1). $P_{POWERCLASS}$ may be the NB-IoT capable UE's intrinsic maximum power (e.g., 23 dBm). By combining these quantities (e.g., $P_{EMAX}$, $P_{POWERCLASS}$), $P_{compensation}$ may reduce the value of the cell selection criterion $S_{rxlev}$, if the NB-IoT capable UE is incapable of achieving a power limit that the base station 105 is assuming.

Additionally or alternatively, the NB-IoT capable UE may determine the $P_{compensation}$ as follows:

$$P_{compensation}=\max(P_{EMAX1}-P_{POWERCLASS},0)-\min(P_{EMAX2},P_{POWERCLASS})-\min(P_{EMAX1},P_{POWERCLASS}) \quad (3)$$

Here, $P_{EMAX1}$ and $P_{EMAX2}$ may be upper limits on the transmit powers that the NB-IoT capable UE is allowed to use, which a base station 105 (e.g., of a cell the NB-IoT is camping on) may advertise as part of a narrowband system information block (e.g., system information block-1-NB, system information block-3-NB, and system information block-5-NB). $P_{POWERCLASS}$ may be the NB-IoT capable UE's intrinsic maximum power. In some cases, if $P_{POWERCLASS}$ is 14 dBs, the NB-IoT capable UE may determine the $P_{compensation}$ as follows:

$$P_{compensation}=\max(P_{EMAX1}-(P_{POWERCLASS}-P_{Offset}),0) \quad (4)$$

Alternatively, the NB-IoT capable UE may determine the $P_{compensation}$ as follows:

$$P_{compensation}=\max(P_{EMAX}-P_{POWERCLASS},0) \quad (5)$$

In some cases, a suitable cell may be a cell that satisfies another criterion such as, a cell selection criterion $S_{qual}$ being greater than zero ($S_{qual}>0$). The NB-IoT capable UE may determine the cell selection criterion $S_{qual}$ as follows:

$$S_{qual}=Q_{qualmeas}-Q_{rqualmin}-Q_{offsettemp} \quad (6)$$

In this equation, $Q_{qualmeas}$ may be a narrowband reference signal received quality, which expresses the signal-to-interference plus noise ratio of the cell-specific reference signals. $Q_{rqualmin}$ may be a minimum value for the narrowband reference signal received quality, which a base station 105 (e.g., of a cell on which the NB-IoT is camping or potentially going to camp) may advertise in a system information block. The $Q_{offsettemp}$ may be an offset applied temporarily to a cell. Therefore, the cell selection criterion $S_{qual}$ may prevent an NB-IoT capable UE from selecting a cell on a frequency that may be subject to high levels of interference.

In some examples, as part of idle cell reselection, NB-IoT capable UEs may receive system information blocks in the narrowband bandwidth. NB-IoT capable UEs may support performing idle cell reselection (e.g., intra-radio access technology idle cell reselection, inter-radio access technology idle cell reselection) according to a cell-rank criterion and may be unable to support cell-priority criterion (e.g., no frequency priority-based ideal cell reselection). That is, cell-rank criterion may be supported for NB-IoT capable UEs for both intra-frequency and inter-frequency idle cell reselection, while cell-priority criterion may be unable to be supported for NB-IoT capable UEs for inter-frequency idle cell reselection.

In some cases, for idle cell reselection, an NB-IoT capable UE may be capable of monitoring at least one intra-frequency carrier and at least two inter-frequency carriers. A base station 105 (e.g., network) may indicate via signaling, up to eight frequencies in a list (e.g., interFreqCarrier-FreqList-NB-r13) for the NB-IoT capable UE to perform measurements on. In some cases, both intra-frequency and inter-frequency NB-IoT idle cell reselection may be supported by NB-IoT capable UEs. A base station 105 may provide idle cell reselection parameters in a narrowband configured system information block (e.g., system information block-3 narrowband, system information block-4 narrowband, and/or system information block-5 narrowband).

An NB-IoT capable UE may be configured with one or more measurements rules for idle cell reselection. In some cases, when determining and evaluating selection criterion $S_{rxlev}$ and $S_{qual}$ of non-serving cells for cell reselection purposes, the NB-IoT capable UE may use parameters provided by the serving cell. An example of measurement rules may include, but is not limited to: if a serving cell satisfies Srxiev being greater than $S_{IntraSearchP}$ ($S_{rxlev} > S_{IntraSearchP}$), the NB-IoT capable UE may select to refrain from performing intra-frequency measurements; otherwise, the NB-IoT capable UE may perform the measurements. In some examples, the NB-IoT capable UE may apply the following measurement rules for NB-IoT inter-frequencies, which may be indicated in system information blocks: if a serving cell satisfies $S_{rlxev}$ being greater than $S_{NonIntraSearchP}$ ($S_{rxlev} > S_{NonIntraSearchP}$), the NB-IoT capable UE may select to refrain from performing inter-frequency measurements; otherwise, the NB-IoT capable UE may perform the measurements. In some cases, if UEs 115 support relaxed monitoring the UEs 115 may further apply limits on the measurements (e.g., if s-SearchDeltaP is present in SystemInformationBlockType3-NB).

An NB-IoT capable UE may perform idle cell reselection according to a cell-rank criterion, which the NB-IoT capable UE may determine as follows:

$$R_s = Q_{meas,s} - Q_{Hyst} - Q_{offsettemp} - Q_{offsetSCPTM} \quad (7)$$

for a serving cell. In this equation, $Q_{meas,s}$ may be a narrowband reference signal received power measurement, $Q_{Hyst}$ may be a hysteresis value, $Q_{offsettemp}$ may be an offset temporarily applied to a cell, and $Q_{offsetSCPTM}$ may be an offset temporarily applied to a single-cell (SC) point-to-multipoint (SC-PTM) frequency. The offset may be applied to all cells on the SC-PTM frequency. If the $Q_{offsetSCPTM}$ is valid, $Q_{offset}$ for inter-frequency neighboring cells (e.g., non-serving cells) is not used.

An NB-IoT capable UE may perform idle cell reselection according to another cell-rank criterion, which the NB-IoT capable UE may determine as follows:

$$R_n = Q_{meas,n} - Q_{offset} - Q_{offsettemp} - Q_{offsetSCPTM} \quad (8)$$

for a neighboring cell (e.g., non-serving cell). Here, $Q_{meas,n}$, $Q_{offsettemp}$, and $Q_{offsetSCPTM}$ may be similar to the values for the serving cell except that the values of these parameters are applied to the neighboring cell. For intra-frequency, $Q_{offset}$ may have a value of zero, or a non-zero value when $Q_{offsets,n}$ is valid. For inter-frequency, $Q_{offset}$ may have a value based on $Q_{offsets,n}$ and $Q_{offsetfrequency}$. In some cases, for NB-IoT idle cell reselection, $Q_{offsetDedicatedfrequency}$ may be any frequency other than the frequency of the dedicated frequency offset, if $Q_{offsetDedicatedfrequency}$ is valid; otherwise this equals $Q_{offsetfrequency}$ (if $Q_{offsetDedicatedfrequency}$ is valid, then $Q_{offsetfrequency}$ is not used). The NB-IoT capable UEs 115 may rank the cells according to the determined $R_s$ and $R_n$. If a cell is ranked as a best cell, the NB-IoT capable UEs 115 may perform cell reselection to that cell. If this cell is found to be unsuitable, then the UE 115 may monitor for other candidate non-serving cells. The NB-IoT capable UEs 115 may reselect a new serving cell based on the new serving cell being better ranked than the current serving cell during a time interval (e.g., $T_{reselectionRAT}$). In some cases, NB-IoT capable UEs 115 may initiate the process of reselecting a new serving cell when more than one second has elapsed since the NB-IoT capable UEs 115 camped on the current serving cell. Upon identifying a non-serving cell satisfying a cell reselection criterion, NB-IoT capable UEs 115 may perform the connection procedure with the non-serving cell, and a connection release procedure with the serving cell. As a result, the non-serving cell becomes the serving cell.

In some cases, as part of idle cell reselection using cell-rank criterion, if an NB-IoT capable UE or UE in enhance coverage mode is capable of SC-PTM reception and is receiving or interested in a multimedia broadcast multicast service (MBMS) and is capable of receiving this MBMS while camping on a frequency on which MBMS is provided (SC-PTM frequency), the UE may consider $Q_{offsetSCPTM}$ to be valid during the MBMS session as long as the following conditions are fulfilled: a system information block (e.g., SIB15 (or SIB15-NB)) of the serving cell indicates for that frequency one or more MBMS SAIs included in the MBMS user service description of this service; or the system information block (e.g., SIB15 (or SIB15-NB)) is not broadcast in the serving cell and that frequency is included in the user service description of this service. In some cases, the UEs 115 may search for a higher ranked cell on another frequency for cell reselection as soon as possible after the UE 115 ceases using $Q_{offsetSCPTM}$. In some cases, UEs 115 may perform ranking of all cells that satisfy the cell selection criterion S, but may exclude all closed subscriber group cells that are known by the UEs 115 not to be closed subscriber group member cells. Additionally, or alternatively, when the UE 115 uses an infinite value for $Q_{offsetSCPTM}$ (e.g., infinite dBs), the UEs 115 may set $Q_{offsetSCPTM}$ to zero and rank the cells on the SC-PTM frequencies first. If the UEs 115 cannot find a suitable cell on an SC-PTM frequency, the UEs 115 may rank the cells on all frequencies.

Some examples of UEs 115 may be eMTC UEs having reduced bandwidth limited complexity (e.g., bandwidth limited). An eMTC UE may operate according to at least one category including: category M1 or category M2. An eMTC UE may also use a higher portion of a system bandwidth (e.g., 1.08 MHz (e.g., six physical resource blocks (PRBs)) compared to NB-IoT capable UEs. As part of cell selection and idle cell reselection, eMTC UEs may receive system information blocks configured for eMTC UEs (e.g., system information block-br). The idle cell reselection procedure (e.g., intra-radio access technology idle cell reselection, inter-radio access technology idle cell reselection) for eMTC UEs may be similar to legacy UEs (e.g., idle cell reselection in LTE systems). For example, eMTC UEs may measure reference signal received power (RSRP) and reference signal received quality (RSRQ) to determine whether a cell measurement criterion is satisfied before initiating the idle cell reselection.

In some examples, UEs 115 may be non-bandwidth limited UEs and may be capable of operating according to at least one category including: category 0, category 1, etc.

A non-bandwidth limited UE may use a portion of a system bandwidth (e.g., 1.4 MHz, 3 MHz, 5 MHz, 10 MHz, 15 MHz, or 20 MHz) that is greater than the portion of a system bandwidth used by the NB-IoT capable UEs or an eMTC UE. As part of cell selection and idle cell reselection, non-bandwidth limited UEs may receive legacy LTE system information blocks. Non-bandwidth limited UEs may measure RSRP and RSRQ based on LTE cell specific reference signals, to determine whether a cell measurement criterion is satisfied before initiating the idle cell reselection. The idle cell reselection procedure (e.g., intra-radio access technology idle cell reselection, inter-radio access technology idle cell reselection) for non-bandwidth limited UEs may be similar to legacy UEs (e.g., idle cell reselection in LTE systems). For example, intra-radio access technology idle cell reselection (e.g., intra-frequency) may be performed according to a cell-rank criterion, while inter-radio access technology idle cell reselection (e.g., inter-frequency) may be performed according to a cell-priority criterion (e.g., high priority, same priority, low priority). In some examples, intra-radio access technology, inter-radio access technology, UTRAN, GERAN, CDMA2000 idle cell reselection may be performed according to the cell-priority criterion for non-bandwidth limited UEs.

Some examples of UEs 115 may support a coverage enhancement mode. A UE supporting this type of mode may be a bandwidth limited UE or a non-bandwidth limited UE, or both. In some cases, the coverage enhancement mode may have two modes including mode A supporting moderate coverage enhancement, and mode B supporting deep coverage. UEs 115 may receive system information blocks (e.g., system information block-br) when operating in either mode. Legacy system information blocks may be used to provide cell reselection criteria to the UEs 115 when the UEs 115 are non-bandwidth limited UEs and operate in normal coverage mode.

In some cases, a cell selection procedure may be initiated when UEs 115 operate under normal coverage mode. If the cell selection procedure fails, the UEs 115 may perform the cell selection procedure under the enhanced coverage mode. In the enhanced coverage mode, the idle cell reselection may be based on a cell-ranking criterion (e.g., for both intra- and inter-frequency idle cell reselection) when a current serving cell can be accessed using enhanced coverage mode, and cell-priority criterion may not be used (e.g., there may be no frequency priority supported). In some cases, when UEs 115 camp on a suitable closed subscriber group (CSG) cell the UEs 115 may consider a current frequency to be a highest priority frequency (e.g., higher than the network configured values), irrespective of any other priority value allocated to the current frequency, if the cell can be accessed when the UEs 115 operate in the normal coverage mode.

Some examples of UEs 115 may support enhanced data rates for GSM evolution (EDGE) radio access network (GERAN). When supporting EDGE GERAN, UEs 115 may occupy a portion of a system bandwidth (e.g., 200 kHz channel bandwidth). As part of cell selection and idle cell reselection, EDGE GERAN UEs may measure received signal strength indicators (RSSI) based on cell specific reference signals (e.g., pilot signals), to determine whether a cell measurement criterion is satisfied before initiating the idle cell reselection. For EDGE GERAN UEs, intra-radio access technology idle cell reselection may be for EDGE GERAN and inter-radio access technology idle cell reselection may be for UTRAN, LTE, etc.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband (WB) signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may determine a UE capability for available radio access technologies. For example, radio access technologies may include NB-IoT, LTE, eMTC, a GSM and enhanced data rates for GERAN, among others. The UE 115 may determine which of the available radio access technologies are suitable for idle cell reselection (e.g., inter-radio access technology idle cell reselection, intra-radio access technology idle cell reselection) according to the UE capabilities, which may be related to a UE category or UE usage mode (e.g., voice centric mode or data centric mode, or any other mode) of the UE, etc. In some cases, the UE 115 may transmit a signal indicating the UE capabilities to a network entity (e.g., a base station 105, the core network 130, a mobility management entity (MME)) in wireless communications with the UE 115 based on the UE capabilities. The network entity may broadcast system information messages for different radio access technologies for idle cell reselection (e.g., inter-radio access technology idle cell reselection procedure, intra-radio access technology idle cell reselection procedure), which the UE 115 may use to perform the idle cell reselection.

Figure 2:
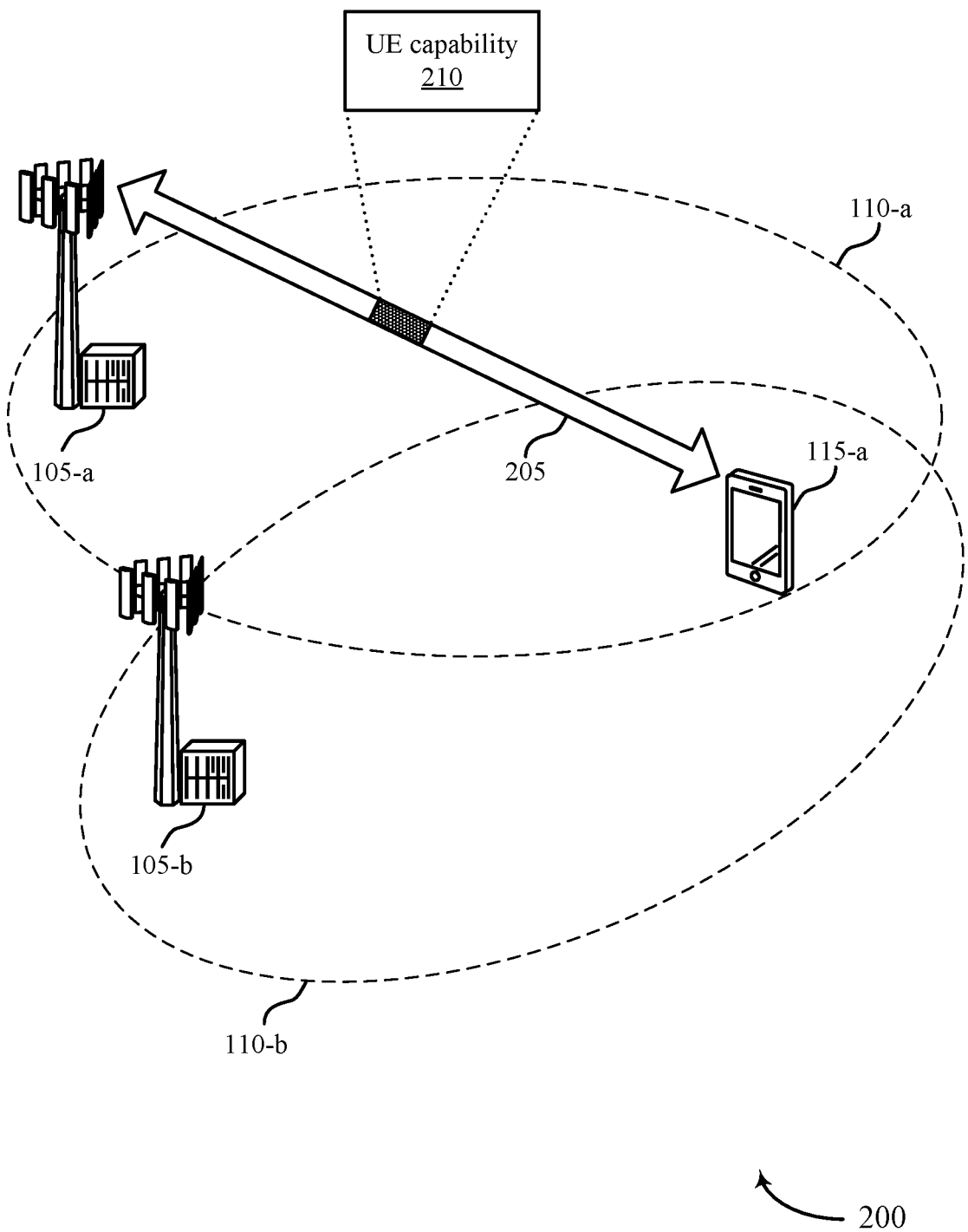

FIG. 2 illustrates an example of a wireless communications system 200 that supports idle cell reselection and UE capability signaling in accordance with aspects of the present disclosure. In some examples, the wireless communications system 200 may implement aspects of the wireless communications system 100. In some examples, the wireless communications system 200 may include a base station 105-*a*, a base station 105-*b*, and UE 115-*a*, which may be examples of corresponding devices as described with reference to FIG. 1.

The wireless communications system 200 may support a multi-radio access technology, multi-connectivity architecture to enable efficient operations across multiple access types within a network system. For example, the wireless communications system 200 may support a radio network architecture integration of multiple radio access technology circumstances supporting traffic steering, link selection, and aggregation of traffic flows associated with cell deployments (e.g., coverage areas), across supported channel bandwidth complexities. The described mechanisms may support enhanced throughput and increased reliability with multi-level mobility support and access at the UE 115-*a*, as part of mobility management procedures.

Base stations 105-*a* and 105-*b* may support cell deployment in multi-band and multi-radio access technology scenarios according to network configuration and support as provided by a network command entity. Each of base stations 105-*a* and 105-*b* may manage the one or more cell deployments (e.g., coverage areas) serving data traffic within a supported bandwidth frequency of a channel bandwidth (e.g., intra-frequency), across channels as part of a multi-channel radio access technology implementation (e.g., inter-frequency), or across radio networks as part of the connectivity architecture (e.g., inter-radio access technology). The supported management at the base stations 105 may include inter-operations between NR operation procedures and supported network environments including LTE and legacy UMTS/GSM operating procedures (e.g., UTRAN, GERAN). Further, the supported management may support additional network capabilities associated with narrowband resource scaling for addressing IoT use implementations including optimized low cost/power scenarios (e.g., delay-tolerant, low-throughput IoT use cases).

UE 115-*a* may be a multi-radio access technology supported UE and configured to monitor multiple inter-frequency and inter-radio access technology frequencies supported at UE 115-*a* based on a usage mode implementation at the UE 115-*a* or a deployment mode of the serving cell 110-*a* (e.g., coverage area). For example, UE 115-*a* may identify a current usage mode implementation (e.g., voice-centric mode, data-centric mode) and evaluate the deployment mode of the serving cell 110-*a* or a neighboring cell 110-*b* (e.g., coverage area), or both. Examples of voice-supported radio access technologies may include E-UTRAN, Circuit-Switched Fallback (CSFB) to 2G/3G, eMTC (coverage-enhancement (CE) Mode A), GERAN, CDMA2000 1×RTT, among others. Some examples of non-voice supported radio access technologies may include CE Mode B, NB-IoT. UE 115-*a* may determine a set of UE capabilities 210 associated with the supported radio access technologies and further identify a candidate set of supported neighboring cells (e.g., candidate cells) for NB-IoT service capability based on the current usage mode and deployment mode. UE 115-*a* may additionally monitor the candidate set based on the determination.

By way of example, the UE 115-*a* may determine that a signal quality of the serving cell 110-*a* deployed at the UE 115-*a* satisfies a cell measurement criterion, the serving cell 110-*a* may be associated with a first radio access technology supporting a voice service for the UE 115-*a*. In this case, the UE 115-*a* may operate in a voice-centric mode. As such, it may be important for the UE 115-*a* to camp on a radio access technology that supports voice services. The UE 115-*a* may, in some cases, disable access stratum capability for neighboring cells incapable of supporting the voice service for the UE 115-*a* when the UE 115-*a* is camping on the serving cell 110-*a* supporting the voice service. The UE 115-*a* may initiate measurement of the neighboring cell 110-*b* associated with a second radio access technology on which the UE 115-*a* is capable of camping on based on the signal quality satisfying the cell measurement criteria. The second radio access technology may be different from the first radio access technology. For example, the first radio access technology and the second radio access technology may be a NB-IoT, LTE, eMTC, among others.

In some cases, the UE 115-*a* may perform an inter-radio access technology cell reselection procedure, which may be a ranking-based and/or priority-based inter-radio access technology cell reselection procedure and performed autonomously by the UE 115-*a*. For example, the UE 115-*a* may initiate an inter-radio access technology cell reselection procedure to access the neighboring cell 110-*b* associated with the second radio access technology. In this example, the neighboring cell 110-*b* may be associated with the second radio access technology that may be capable or incapable of supporting the voice service for the UE 115-*a*. It may be important for the UE 115-*a* to camp on a radio access technology that supports voice services when the UE 115-*a* is operating in a voice-centric mode. In this case, the UE 115-*a* may determine to assign higher priority for cells that support these voice services when performing cell reselection. For example, the UE 115-*a* may prioritize the neighboring cell 110-*b* associated with the second radio access technology over another neighboring cell (not shown) associated with a third radio access technology based on the second radio access technology capability to support the voice service for the UE 115-*a* and the third radio access technology incapability to support the voice service for the UE 115-*a*.

In some cases, if a voice-centric UE is unable to find any radio access technologies supporting voice services, the voice-centric UE may choose to operate in another mode (e.g., coverage enhancement mode or NB-IoT (e.g., no voice support)) and may indicate "data centric" in non-access stratum signaling. For example, the UE 115-*a* may configure a UE capability of the UE 115-*a*, for the third radio access technology that is incapable of supporting the voice service for the UE 115-*a*, when the UE 115-*a* is unable to identify the second radio access technology capable of supporting the voice service for the UE 115-*a*. Alternatively, the UE 115-*a* may access the neighboring cell 110-*b* associated with the second radio access technology based on the inter-radio access technology cell reselection procedure, and the second radio access technology incapability of supporting the voice service for the UE 115-*a*. In this case, the UE 115-*a* may transmit, in a non-access stratum signaling, an indication to suspend the voice service and enable a data service while camping on the neighboring cell 110-*b*.

As such, with reference to usage mode implementation, when the UE 115-*a* is in a voice-centric mode the UE 115-*a* may determine when to switch to operating in a data-centric mode, and perform idle cell reselection (e.g., from LTE/eMTC/GERAN to NB-IoT). Alternatively, if the UE 115-*a* is operating in NB-IoT, the UE 115-*a* may be triggered autonomously to perform idle cell reselection to a suitable cell (e.g., LTE/UMTS/GSM cell), for example, when the UE 115-*a* is triggered to perform an emergency call or normal voice calls even if the NB-IoT coverage is satisfiable. In some cases, voice and data-centric modes may be unsupported and signaled over NB-IoT. For NB-IOT, this scenario may enable the UE 115-*a*, for example, to re-enable its LTE/GSM/UMTS capabilities locally when emergency call or a normal voice call is triggered.

In some cases, the UE 115-*a* may assign no priority for different radio access technologies and use only a rank-based inter-radio access technology cell reselection procedure, for example, from NB-IoT to LTE (with no priority assigned for various inter-radio access technologies and frequencies). The inter-radio access technologies measurements may be performed when a serving NB-IoT cell's selection criterion is below a value (e.g., Snonintrasearch). In another case, the UE 115-*a* may assign a priority for different radio access technologies and perform the inter-radio access technology cell reselection procedure based on a threshold criterion rather than a rank. For example, inter-radio access technology measurements may be performed when a serving NB-IoT cell's selection criterion is below a value (e.g., Snonintrasearch). This may occur, in some examples, when the serving NB-IoT cell is below a first threshold and a target radio access technology cell (e.g., neighboring cell 110-*b*) is above the first threshold for a reselection timer duration. In further cases, the UE 115-*a* may assign a priority for different radio access technologies and perform inter-radio access technology cell reselection procedure based on legacy-based techniques.

In some cases, the ranking-based and/or priority-based inter-radio access technology cell reselection procedure may be based on a set of UE capabilities 210. The UE 115-*a* may transmit signaling indicating the set of UE capabilities 210 to the base station 105-*a* based on supported (e.g., available) radio access technologies and a UE usage mode (e.g., a voice centric mode or a data centric mode, or any other mode) of the UE 115-*a*. The UE 115-*a* may identify, from the set of UE capabilities 210, a UE capability for a radio access technology associated with the serving cell 110-*a* on which the UE 115-*a* may be camping on in an idle state. The UE 115-*a* may include the UE capability for the serving cell 110-*a* in the signal based on one or more of the radio access technology associated with the serving cell 110-*a* or the UE usage mode. The set of available radio access technologies may include NB-IoT, LTE, eMTC, or GSM and EDGE GERAN, or a combination thereof.

The UE 115-*a* may identify, from the set of UE capabilities 210, a second UE capability for a second radio access technology from the set of available radio access technologies, the second radio access technology associated with the neighboring cell 110-*b* on which the UE 115-*a* may be capable of or is camping on in the idle state. The UE 115-*a* may also include the second UE capability for the neighboring cell 110-*b* in the signal to a network entity in wireless communications with the UE 115-*a* based on the second radio access technology associated with the neighboring cell 110-*b* and the UE usage mode. The second radio access technology associated with the neighboring cell 110-*b* may be different from the radio access technology associated with the serving cell 110-*a* on which the UE 115-*a* is camping on in the idle state. In some cases, the UE 115-*a* may include, in the signal to the network entity in wireless communications with the UE 115-*a*, other UE capability associated with the set of UE capabilities 210 based on one or more of the UE 115-*a* camping on the serving cell 110-*a* or the associated neighboring cell 110-*b* and the UE usage mode. The additional UE capability may be associated with an additional radio access technology associated with another neighboring cell on which the UE 115-*a* is not camping.

To handle various UE capabilities 210 related to different radio access technologies, the core network entity (e.g., MME) may store the UE capabilities 210 related to different radio access technologies and provide them to different base stations connected to the same core network entity (e.g., the same MME) when appropriate. For example, the core network entity (e.g., MME) may store NB-IoT specific UE capability information when the UE 115-*a* provides the NB-IoT UE capability while camping on NB-IoT base station. In another deployment, when the UE 115-*a* is camping on NB-IoT, the base station 105 or the core network entity (e.g., MME) may transmit, if available, the NB-IoT specific UE capability information to the narrowband E-UTRAN. In this deployment, the core network entity (e.g., MME) may store the NB-IoT UE capability information in the UE-specific NB-IoT context message and the base station 105 or another network entity (e.g., MME) may not have access to wideband E-UTRAN (WB EUTRAN) UE capability information. The core network entity (e.g., MME) may also transmit, if available, in the UE-specific NB-IoT context message, UE-specific UE capability information associated with a radio access technology. The base station 105 or the core network entity (e.g., MME) may additionally or alternatively transmit, if available, UE capability information including WB E-UTRAN UE capability information and not NB-IoT UE capability information when the UE 115-*a* is camping on WB E-UTRAN. In this case, the core network entity (e.g., MME) may store the WB E-UTRAN UE capability information in a UE-specific WB E-UTRAN context and the core network entity (e.g., MME) may not have WB E-UTRAN UE capability information in the context message. The base station 105 or another network entity (e.g., MME) may also transmit, if available, in the UE-specific E-UTRAN context, UE-specific UE capability information associated with a radio access technology.

In some cases, when the UE 115-*a* performs idle cell reselection between NB-IoT and other RATs, the UE 115 may switch to the appropriate UE capabilities 210. In some cases, if the core network entity (e.g., MME) does not have UE capability information, it may request UE capability information from the UE 115-*a*. For example, the UE 115-*a* may receive a system information block from at least one of the base stations 105 including a set of parameters to use for an inter-radio access technology cell reselection procedure to switch from camping on the serving cell 110-*a* associated with the radio access technology to a neighboring cell 110-*b* associated with a second radio access technology based on the UE capability, and perform an inter-radio access technology cell reselection procedure based on the set of parameters received in the system information block. The radio access technology and the second radio access technology may include a NB-IoT, LTE, or eMTC, among others. In some examples, the system information block may include an indication of a NB-IoT frequency and a priority of the NB-IoT frequency. The system information block may, in some cases, be a legacy system information block.

In some cases, the UE 115-*a* may support both NB-IoT and WB E-UTRAN. In such cases, the UE 115-*a* may provide NB-IoT UE capability when it switches from WB E-UTRAN to NB-IoT. Since NB-IoT may be a low bit-rate RAT, performing as few as two transactions (e.g., the UE 115-*a* may receive a UE capability request, the UE 115-*a* may transmit a UE capability response) may lead to an increase of utilized radio resources and increased power consumption.

The UE 115-*a* may be allowed to report UE capabilities for both NB-IoT and other WB radio access technologies when camped on, for example, WB radio access technologies, for example, such as LTE, eMTC, among other examples networks. In one example, the UE 115-*a* may report UE capabilities 210 over WB E-UTRAN and not over NB-IoT because of NB-IoT size. The core network entity (e.g., MME) may store the UE capabilities 210 associated with both the NB-IoT and other radio access technologies. In some cases, the UE 115-*a* may configure a UE category to support multiple radio access technologies (e.g., category NB1, M1 to indicate both NB1 and M1 UE capability), and include an indication of the UE category associated with the UE 115-*a* in an IE) of a message in the signaling based on the configuring.

Additionally, or alternatively the UE 115-*a* may be allowed to report UE capabilities for both WB E-UTRAN (e.g., LTE, eMTC) and NB-IoT when camped on, for example, WB E-UTRAN. For example, when the UE 115-*a* is camping on NB-IoT the UE 115-*a* may provide only NB-IoT UE capabilities to the base station 105-*a* or another network entity (e.g., mobility management entity (MME)) due to the large size of WB E-UTRAN capabilities.

In some cases, a serving cell 110-*a* may be associated with WB E-UTRAN and may belong to a WB E-UTRAN tracking area. When UE capability information associated with a radio access technology is received by the core network entity (e.g., MME) associated with the serving cell 110-*a*, the core network entity (e.g., MME) may store both NB-IoT and WB E-UTRAN capabilities within the WB E-UTRAN context (e.g., in a single location, for example, within an IE). For example, received capabilities associated with a radio access technology may be transparent to the core network entity (e.g., MME) (e.g., stored in an IE that is used to transparently pass information (e.g., a transparent container)).

In some cases, the UE 115-*a* may perform a service request or tracking area update from the serving cell 110-*a* that may be associated with WB E-UTRAN. In this case, the core network entity (e.g., MME) may provide both NB-IOT and WB E-UTRAN capabilities to the serving cell 110-*a*. In some examples, the serving cell 110-*a* associated with WB E-UTRAN may be able to configure the UE 115-*a* to perform NB-IoT RAT cell measurements based on WB E-UTRAN and NB-IoT capabilities received by the base station 105-*a* or from the core network entity (e.g., MME). Additionally, or alternatively, the serving cell 110-*a* that may be associated with WB E-UTRAN may be able to redirect the UE 115-*a* from the serving cell 110-*a* associated with WB E-UTRAN to another cell associated with NB-IoT based on received NB-IoT RAT measurement reports.

In some cases, a serving cell 110-*a* may be associated with WB E-UTRAN and may belong to a WB E-UTRAN tracking area. When UE capability information associated with a radio access technology is received by the core network entity (e.g., MME) associated with the serving cell 110-*a*, the core network entity (e.g., MME) may store both NB-IoT and WB E-UTRAN capabilities in two separate locations (e.g., two IEs). Separate UE capability containers or separate IEs may be used to differentiate NB-IoT and WB E-UTRAN capabilities. The UE 115-*a* may perform a service request or tracking area update from the serving cell 110-*a* that may be associated with WB E-UTRAN. In this case, the core network entity (e.g., MME) may provide both NB-IOT and WB E-UTRAN capabilities to the serving cell 110-*a* which may help the serving cell 110-*a* that may be associated with WB E-UTRAN to be able to redirect the UE 115-*a* from the serving cell 110-*a* associated with WB E-UTRAN to another cell associated with NB-IoT.

In some cases, the UE 115-*a* may perform a service request or tracking area update from a serving cell 110-*a* that may be associated with NB-IoT. In this case, the base station 105-*a* or another network entity (e.g., MME) may provide only NB-IoT capabilities to the serving cell 110-*a*. In this case, the UE 115-*a* may not report NB-IoT UE capabilities over the NB-IoT interface.

In some cases, the UE 115-*a* may perform a service request or tracking area update from a serving cell 110-*a* that may be associated with NB-IoT. In this case, the core network entity (e.g., MME) may provide both NB-IoT and WB E-UTRAN capabilities to the serving cell 110-*a*. In this case, the UE 115-*a* may not report NB-IoT UE capabilities over the NB-IoT interface. Additionally, the serving cell 110-*a* that may be associated with NB-IoT may use the WB E-UTRAN UE capability information (e.g., if WB coverage is good) to redirect the UE 115-*a* from the serving cell 110-*a* associated with NB-IoT to another cell associated with WB E-UTRAN.

In some examples, UE capabilities associated with a radio access technology associated may be received by the core network entity (e.g., an MME) from the serving cell associated with NB-IoT (e.g., belonging to NB-IoT tracking area). In this example, the core network entity (e.g., MME) may store NB-IoT UE capabilities in the UE specific NB-IoT context message and may only provide NB-IoT UE capabilities to serving cell 110-*a* associated with NB-IoT.

Figure 3:
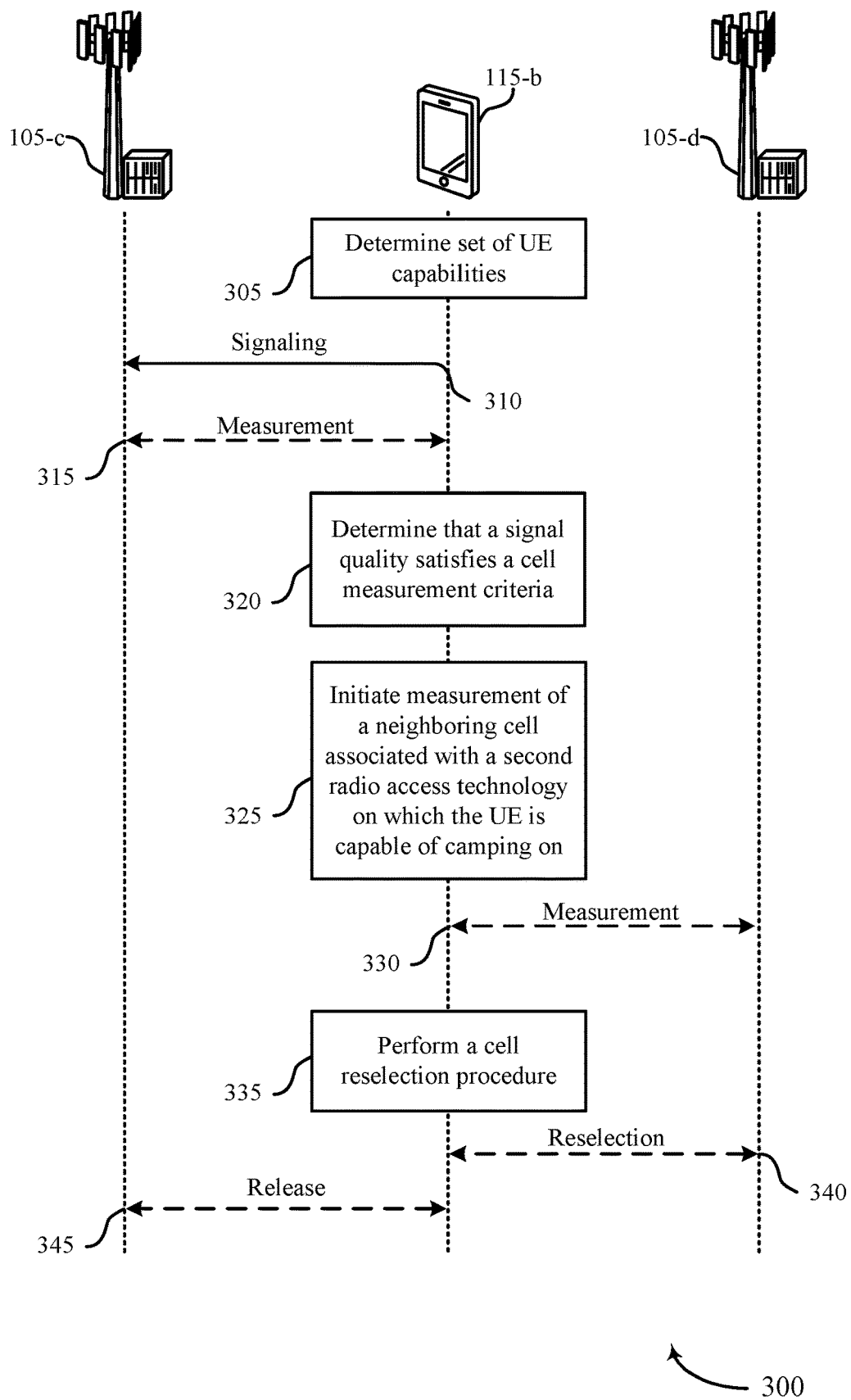
FIG. 3 illustrates an example of a process flow that supports idle cell reselection and UE capability signaling in accordance with aspects of the present disclosure.

FIG. 3 illustrates an example of a process flow 300 that supports idle cell reselection and user equipment capability signaling in accordance with aspects of the present disclosure. In some examples, the process flow 300 may implement aspects of wireless communications system 100 and 200. For example, base station 105-*c*, base station 105-*d*, and UE 115-*b*, may be examples of the corresponding devices described with reference to FIGS. 1 and 2. In the following description of the process flow 300, the operations between the base station 105-*c*, the base station 105-*d*, and the UE 115-*b* may be transmitted in a different order than the exemplary order shown, or the operations performed by the base station 105-*c*, the base station 105-*d*, and the UE 115-*b* may be performed in different orders or at different times. Certain operations may also be left out of the process flow 300, or other operations may be added to the process flow 300.

At 305, the UE 115-*b* may determine a set of UE capabilities. For example, the UE 115-*b* may determine a set of UE capabilities associated with a set of available radio access technologies of a set of cells including one or more of a serving cell or a neighboring cell. In some examples, the base station 105-*c* may be a serving cell, while the base station 105-*d* may be a neighboring cell. As used herein, the term radio access technology may refer to a system, device, method, or process that corresponds to or implements communications for a specific protocol, communication standard, or a version of a protocol or communication standard in order to access communication services provided by a communication network, such as a core network. Different radio access technologies may implement aspects that are similar but differ in one or more aspects as indicated by their respective protocols, communication standards, and/or versions.

At 310, the UE 115-*b* may transmit signaling indicating the set of UE capabilities to the base station 105-*c*. For example, the UE 115-*b* may transmit the set of UE capabilities to the base station 105-*c* based on the available radio access technologies and a UE usage mode, which may include a voice centric mode or a data centric mode, or any other mode. At 315, the UE 115-*b* may perform measurements. For example, the UE 115-*b* may perform measurements on reference signals transmitted and/or received from the base station 105-*c* to periodically or aperiodically evaluate a connection (e.g., quality of service (QoS)) with the base station 105-*c*. At 320, the UE 115-*b* may determine that a signal quality satisfies a cell measurement criterion. For example, the UE 115-*c* may determine that a signal quality of the base station 105-*c* deployed at the UE 115-*b* satisfies a cell measurement criterion. In some examples, the base station 105-*c* may be associated with a first radio access technology supporting a voice service for the UE 115-*b*.

At 325, the UE 115-*b* may initiate a measurement of a neighboring cell associated with a second radio access technology on which the UE 115-*b* is capable of camping on. At 330, the UE 115-*b* may perform measurements (e.g., reference signal measurements) on one or more neighboring cells to identify a neighboring cell that the UE 115-*b* is capable of camping on. For example, the UE 115-*b* may identify the base station 105-*d* as a suitable neighboring cell for camping on. At 335, the UE 115-*b* may perform a cell reselection procedure. For example, the cell reselection procedure may include an inter-radio access technology cell reselection procedure to access the base station 105-*d* associated with the second radio access technology. At 340, the UE 115-*b* may perform the reselection to the base station 105-*d*, for example, switching over to camping on the base station 105-*d*. In some cases, after accessing or switching to the base station 105-*d*, the UE 115-*b* may transmit, in a non-access stratum signaling, an indication to suspend the voice service and enable a data service while camping on the base station 105-*d*. At 345, the UE 115-*b* may release the connection with the base station 105-*c*.

Figure 4:
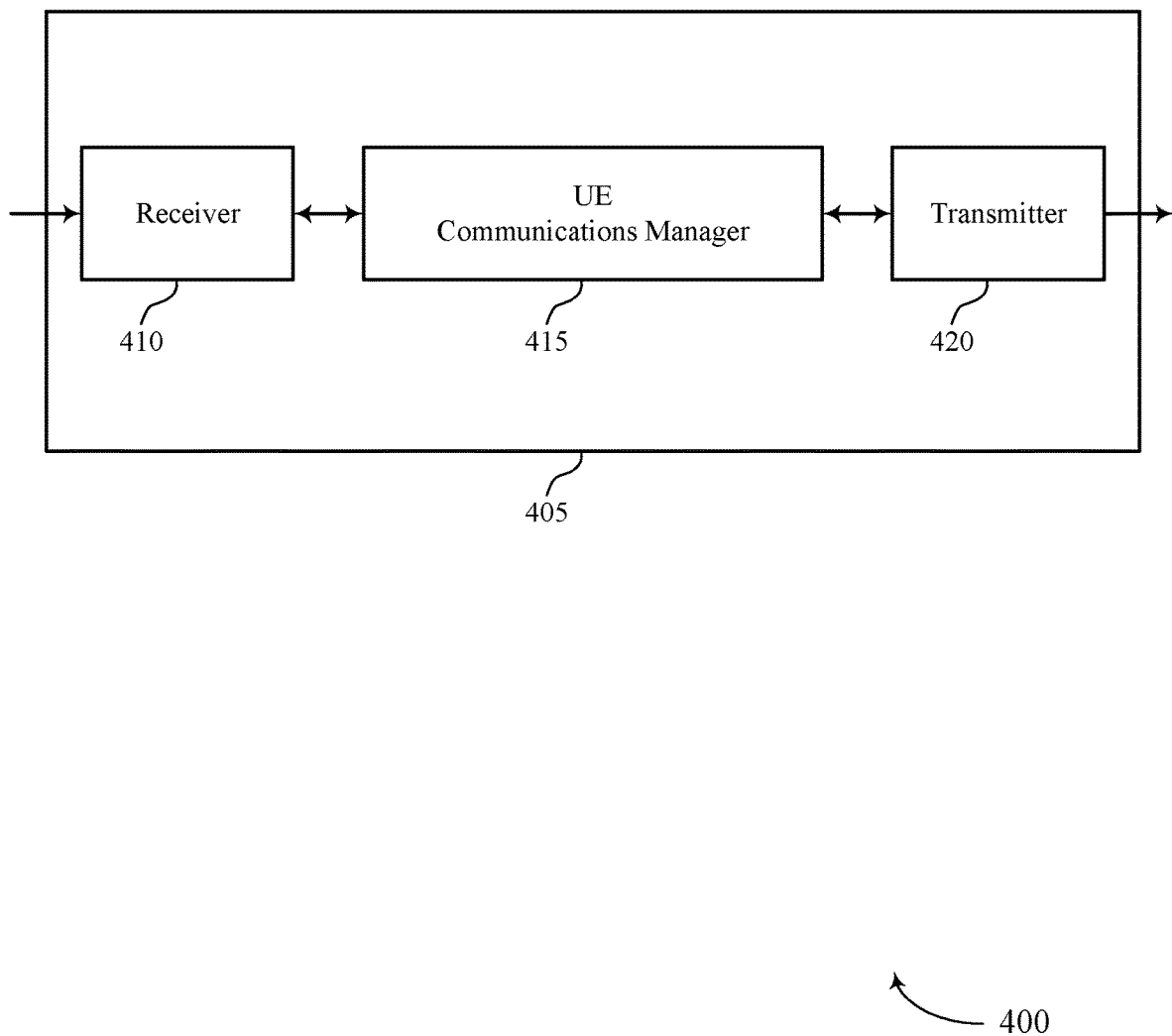
FIGS. 4 and 5 show block diagrams of devices that support idle cell reselection and UE capability signaling in accordance with aspects of the present disclosure.

FIG. 4 shows a block diagram 400 of a device 405 that supports idle cell reselection and UE capability signaling in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to idle cell reselection and user equipment capability signaling). Information may be passed on to other components of the device 405. The receiver 410 may be an example of aspects of the transceiver 720 described with reference to FIG. 7. The receiver 410 may utilize a single antenna or a set of antennas.

The UE communications manager 415 may determine a set of UE capabilities associated with a set of available radio access technologies of a set of cells including one or more of a serving cell or a neighboring cell and transmit signaling indicating the set of UE capabilities to a network entity in wireless communications with the device 405 based on the available radio access technologies and a UE usage mode.

The UE communications manager 415 may also determine that a signal quality of a serving cell deployed at the device 405 satisfies a cell measurement criteria, the serving cell associated with a first radio access technology supporting a voice service for the device 405, initiate measurement of a neighboring cell associated with a second radio access technology on which the device 405 is capable of camping on based on the signal quality satisfying the cell measurement criteria, where the second radio access technology is different from the first radio access technology, and initiate an inter-radio access technology cell reselection procedure to access the neighboring cell associated with the second radio access technology, where the neighboring cell associated with the second radio access technology is capable or incapable of supporting the voice service for the device 405. The UE communications manager 415 may be an example of aspects of the UE communications manager 710 described with reference to FIG. 7.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 415 as described herein may be implemented to realize one or more potential advantages. One implementation may allow a UE to save power and increase battery life by performing a cell reselection process while in an idle mode. Additionally or alternatively, the UE 115 may further save time resources by determining the available technologies suitable for idle cell reselection based on the UE capabilities. Another implementation may provide improved throughout and reliability of service at the UE 115, by supporting multi-connectivity architecture across multiple access types.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
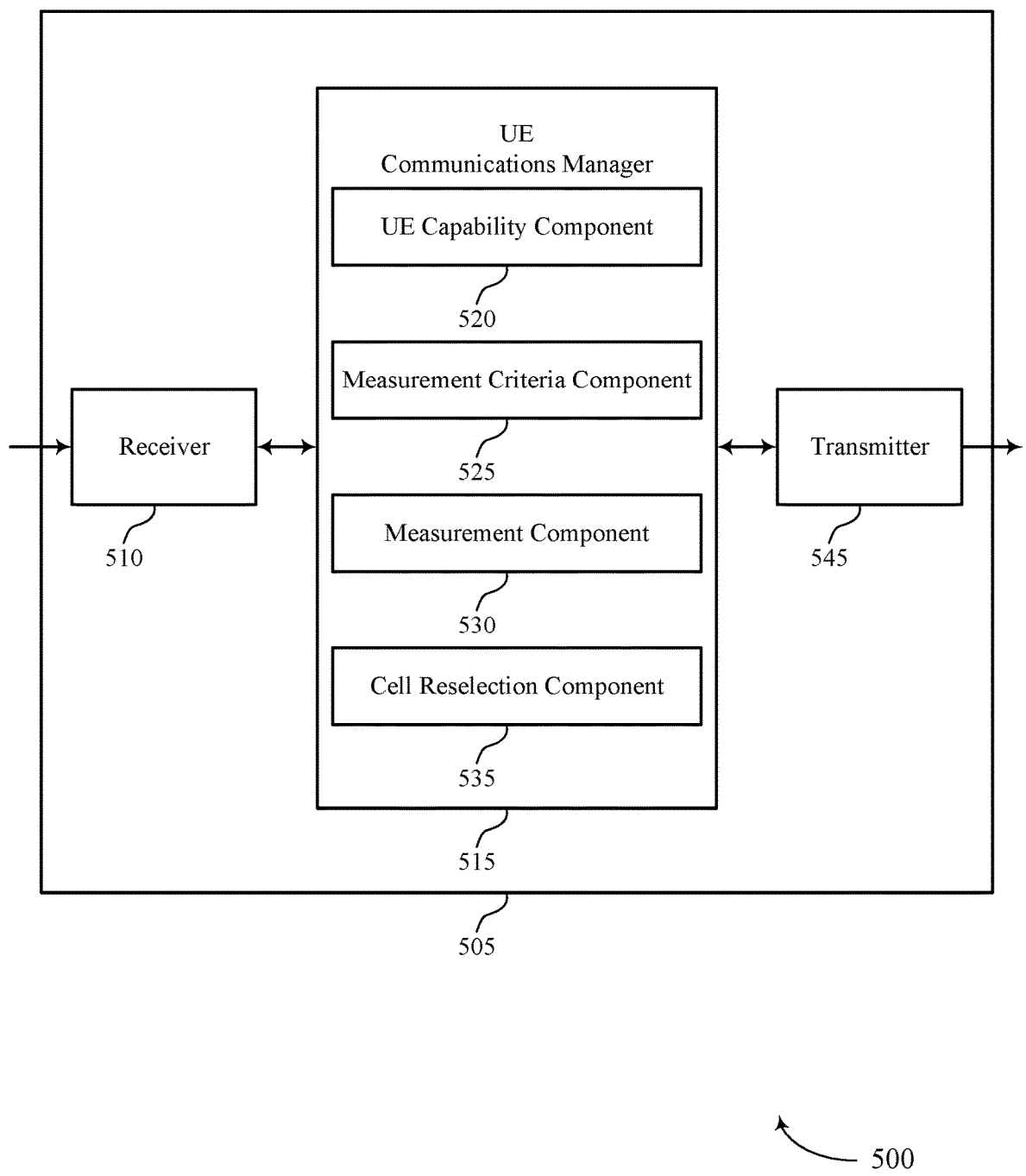

FIG. 5 shows a block diagram 500 of a device 505 that supports idle cell reselection and UE capability signaling in accordance with aspects of the present disclosure. The device 505 may be an example of aspects of a device 405 or a UE 115 as described herein. The device 505 may include a receiver 510, a UE communications manager 515, and a transmitter 545. The device 505 may also include a processor. Each of these components may be in communication with one another (e.g., via one or more buses).

The receiver 510 may receive information such as packets, user data, or control information associated with various information channels (e.g., control channels, data channels, and information related to idle cell reselection and user equipment capability signaling). Information may be passed on to other components of the device 505. The receiver 510 may be an example of aspects of the transceiver 720 described with reference to FIG. 7. The receiver 510 may utilize a single antenna or a set of antennas.

The receiver 510 may receive a system information block from a network including a set of parameters to use for an inter-radio access technology cell reselection procedure to switch from camping on a serving cell associated with a radio access technology to a neighboring cell associated with a second radio access technology based on a UE capability, where the radio access technology and the second radio access technology may include NB-IoT, LTE), or eMTC.

The UE communications manager 515 may be an example of aspects of the UE communications manager 415 as described herein. The UE communications manager 515 may include a UE capability component 520, a measurement criteria component 525, a measurement component 530, and a cell reselection component 535. The UE communications manager 515 may be an example of aspects of the UE communications manager 710 described herein.

The UE capability component 520 may determine a set of UE capabilities associated with a set of available radio access technologies of a set of cells including one or more of the serving cell or the neighboring cell. The measurement criteria component 525 may determine that a signal quality of the serving cell deployed at the UE satisfies a cell measurement criterion, the serving cell associated with a first radio access technology supporting a voice service for the UE. The measurement component 530 may initiate measurement of the neighboring cell associated with the second radio access technology on which the UE is capable of camping on based on the signal quality satisfying the cell measurement criteria, where the second radio access technology is different from the first radio access technology. The cell reselection component 535 may initiate an inter-radio access technology cell reselection procedure to access the neighboring cell associated with the second radio access technology, where the neighboring cell associated with the second radio access technology is capable or incapable of supporting the voice service for the UE.

The transmitter 545 may transmit signals generated by other components of the device 505. In some examples, the transmitter 545 may be collocated with a receiver 510 in a transceiver module. For example, the transmitter 545 may be an example of aspects of the transceiver 720 described with reference to FIG. 7. The transmitter 545 may utilize a single antenna or a set of antennas.

The transmitter 545 may transmit signaling indicating the set of UE capabilities to a network entity in wireless communications with the UE based on one or more of the set of available radio access technologies or a UE usage mode. In some examples, the transmitter 545 may transmit, in a non-access stratum signaling, an indication to suspend the voice service and enable a data service while camping on the neighboring cell.

Figure 6:
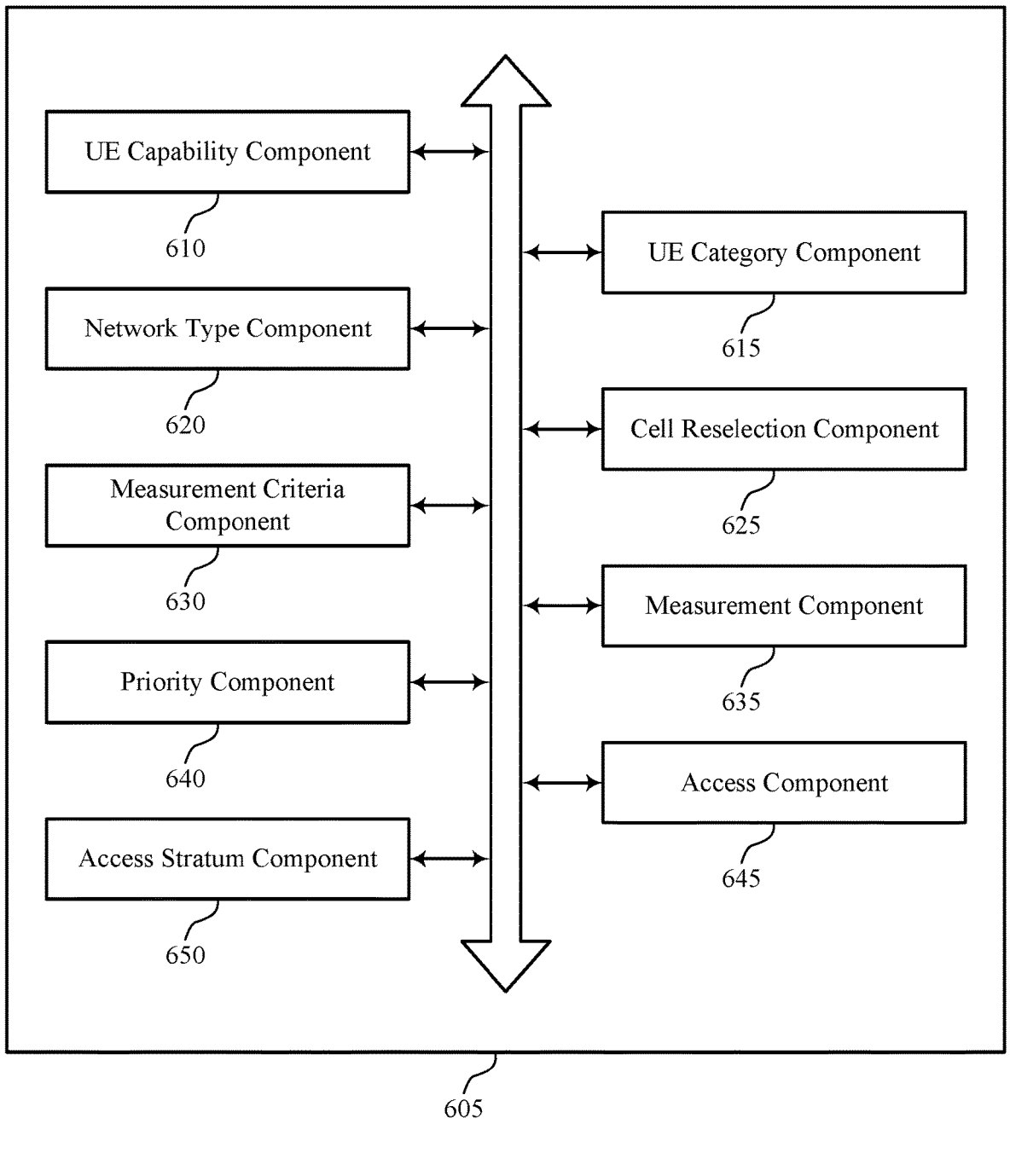
FIG. 6 shows a block diagram of a UE communications manager that supports idle cell reselection and UE capability signaling in accordance with aspects of the present disclosure.

FIG. 6 shows a block diagram 600 of a UE communications manager 605 that supports idle cell reselection and UE capability signaling in accordance with aspects of the present disclosure. The UE communications manager 605 may be an example of aspects of a UE communications manager 415, a UE communications manager 515, or a UE communications manager 710 described herein. The UE communications manager 605 may include a UE capability component 610, a UE category component 615, a network type component 620, a cell reselection component 625, a measurement criteria component 630, a measurement component 635, a priority component 640, an access component 645, and an access stratum component 650. Each of these modules may communicate, directly or indirectly, with one another (e.g., via one or more buses).

The UE capability component 610 may determine a set of UE capabilities associated with a set of available radio access technologies of a set of cells including one or more of a serving cell or a neighboring cell. In some examples, the UE capability component 610 may identify, from the set of UE capabilities, a UE capability for a radio access technology associated with the serving cell on which the UE is camping on in an idle state. In some examples, the UE capability component 610 may include the UE capability for the serving cell in a signal (e.g., dedicated-signaling, RRC signal, non-access stratum signal) based on one or more of the radio access technology associated with the serving cell or the UE usage mode.

In some examples, the UE capability component 610 may identify, from the set of UE capabilities, a second UE capability for a second radio access technology from the set of available radio access technologies, the second radio access technology associated with the neighboring cell on which the UE is camping on in the idle state. In some examples, the UE capability component 610 may include the second UE capability for the neighboring cell in the signal to the network entity in wireless communications with the UE based on one or more of the second radio access technology associated with the neighboring cell or the UE usage mode. In some examples, the UE capability component 610 may include, in the signal to the network entity in wireless communications with the UE, other UE capability associated with the set of UE capabilities based on one or more of the UE camping on the serving cell or an associated neighboring cell and the UE usage mode, where the additional UE capability is associated with an additional radio access technology associated with another neighboring cell on which the UE is not camping on. In some examples, the UE capability component 610 may configure a UE capability of the UE, for a third radio access technology that is incapable to support the voice service for the UE, when the UE is unable to identify the second radio access technology capable to support the voice service for the UE.

In some examples, the UE capability component 610 may determine that one or more of the serving cell or the neighboring cell includes a WB-EUTRAN network or a NB-IoT network, and may determine that the UE is camping on the WB-EUTRAN network, where the set of UE capabilities includes one or more of WB-EUTRAN capabilities or NB-IoT capabilities. In some examples, the UE capability component 610 may transmit one or more of the WB-EUTRAN capabilities or the NB-IoT capabilities in the signaling based on the UE camping on the WB-EUTRAN network. In some examples, the UE capability component 610 may determine that the UE is camping on the NB-IoT network, where the set of UE capabilities includes one or more of WB-EUTRAN capabilities or NB-IoT capabilities.

In some examples, the UE capability component 610 may refrain from including the WB-EUTRAN capabilities in the signaling, and may transmit exclusively the NB-IoT capabilities in the signaling based on the UE camping on the NB-IoT network.

In some cases, the UE capability component 610 may identify a UE configuration to support multiple radio access technologies including the set of available radio access technologies of the set of cells, where the UE configuration includes using separate UE capability contains or separate information elements (IEs) for different radio access technologies. In some cases, the UE capability component 610 may determine that one or more of the serving cell or the neighboring cell including a WB-EUTRAN network or a NB-IoT network and may determine that the UE is camping on the WB-EUTRAN network and the NB-IOT network, where the set of UE capabilities includes one or more of WB-EUTRAN capabilities or NB-IoT capabilities. In some cases, the UE capability component 610 may transmit one or more of the WB-EUTRAN capabilities or the NB-IoT capabilities in the signaling based on the UE configuration to support the multiple radio access technologies.

The UE category component 615 may configure a UE category to support the set of available radio access technologies. In some examples, the UE category component 615 may include an indication of the UE category associated with the UE in an IE of a message in the signaling based on the configuring, the UE category indicating a type of UE and the set of UE capabilities for supporting the set of available radio access technologies. The network type component 620 may identify a core network type associated with supporting the set of available radio access technologies, where transmitting the signal indicating the set of UE capabilities is further based on the core network type. Based on configuring a UE category to support the set of available radio access technologies, the UE category component 615 may efficiently determine a radio access technology that is suitable for a cell selection process based on the capabilities of the UE. Further the network type component 620 may be able to identify a core network type more efficiently and enable the UE to transmit the signal indicating the UE capabilities using fewer resources.

The cell reselection component 625 may initiate an inter-radio access technology cell reselection procedure to access the neighboring cell associated with the second radio access technology, where the neighboring cell associated with the second radio access technology is capable or incapable of supporting the voice service for the UE. In some examples, the cell reselection component 625 may perform the inter-radio access technology cell reselection procedure based on a set of parameters received in a system information block. In some cases, the system information block may include one or more of a list of neighboring cells including one or more neighboring cells associated with the second radio access technology or information related to one or more extended coverage capabilities of one or more neighboring cells in the list of neighboring cells. In some cases, the cell reselection component 625 may skip the inter-radio access technology cell reselection procedure associated with the one or more neighboring cells in the list of neighboring cells based at least in part on one or more of the one or more neighboring cells not supporting an extended coverage mode.

The measurement criteria component 630 may determine that a signal quality of the serving cell deployed at the UE satisfies a cell measurement criterion, the serving cell associated with the first radio access technology supporting a voice service for the UE. The measurement component 635 may initiate measurement of the neighboring cell associated with the second radio access technology on which the UE is capable of camping on based on the signal quality satisfying the cell measurement criteria, where the second radio access technology is different from the first radio access technology. In some cases, the measurement component 635 may receive, from a network entity, a configuration to perform one or more cell measurements related to the set of available radio access technologies of the set of cells including one or more of the serving cell or the neighboring cell based on transmitting the set of UE capabilities where one or more of the serving cell or the neighboring cell includes a WB-EUTRAN radio access network or a NB-IoT network and the set of UE capabilities includes one or more WB-EUTRAN capabilities or NB-IoT capabilities. In some cases, the measurement component 635 may transmit to the network entity a cell measurement report to redirect the UE from the serving cell to the neighboring cell based at least in part on performing the one or more cell measurements related to the set of available radio access technologies of the set of cells.

The priority component 640 may prioritize the neighboring cell associated with the second radio access technology over a second neighboring cell associated with a third radio access technology based on the second radio access technology capability to support the voice service for the UE and the third radio access technology incapability to support the voice service for the UE. The access component 645 may access the neighboring cell associated with the second radio access technology based on the inter-radio access technology cell reselection procedure, where the second radio access technology is incapable of supporting the voice service for the UE. The access stratum component 650 may disable access stratum capability for neighboring cells incapable of supporting the voice service for the UE when the UE is camping on the serving cell supporting the voice service.

Figure 7:
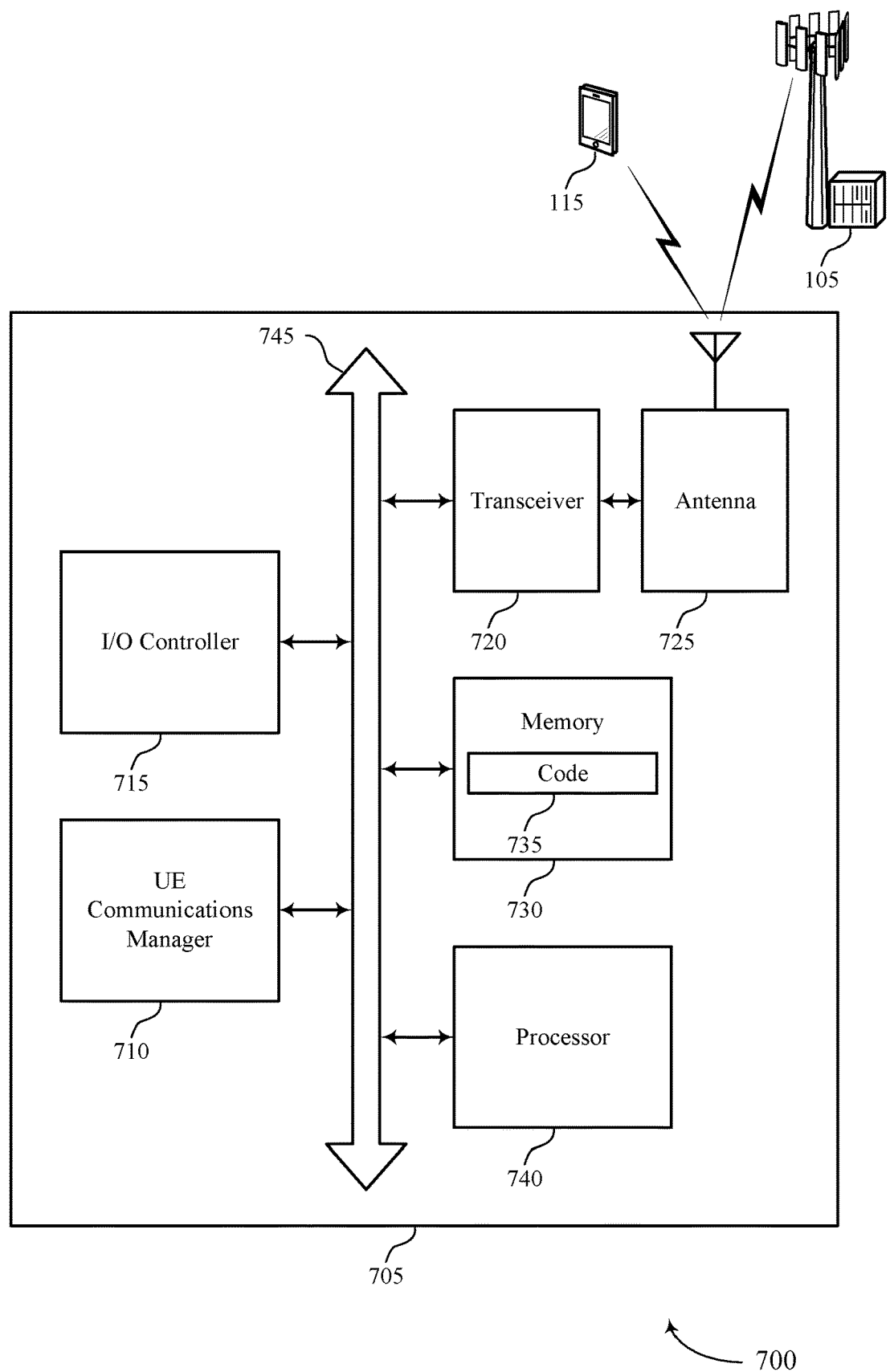
FIG. 7 shows a diagram of a system including a device that supports idle cell reselection and UE capability signaling in accordance with aspects of the present disclosure.

FIG. 7 shows a diagram of a system 700 including a device 705 that supports idle cell reselection and user equipment capability signaling in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may determine a set of UE capabilities associated with a set of available radio access technologies of a set of cells including one or more of a serving cell or a neighboring cell and transmit signaling indicating the set of UE capabilities to a network entity in wireless communications with the device 705 based on the available radio access technologies and a UE usage mode. The UE communications manager 710 may also determine that a signal quality of a serving cell deployed at the device 705 satisfies a cell measurement criteria, the serving cell associated with a first radio access technology supporting a voice service for the device 705, initiate measurement of a neighboring cell associated with a second radio access technology on which the device 705 is capable of camping on based on the signal quality satisfying the cell measurement criteria, where the second radio access technology is different from the first radio access technology, and initiate an inter-radio access technology cell reselection procedure to access the neighboring cell associated with the second radio access technology, where the neighboring cell associated with the second radio access technology is capable or incapable of supporting the voice service for the device 705.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touch-screen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases, the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting idle cell reselection and user equipment capability signaling).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
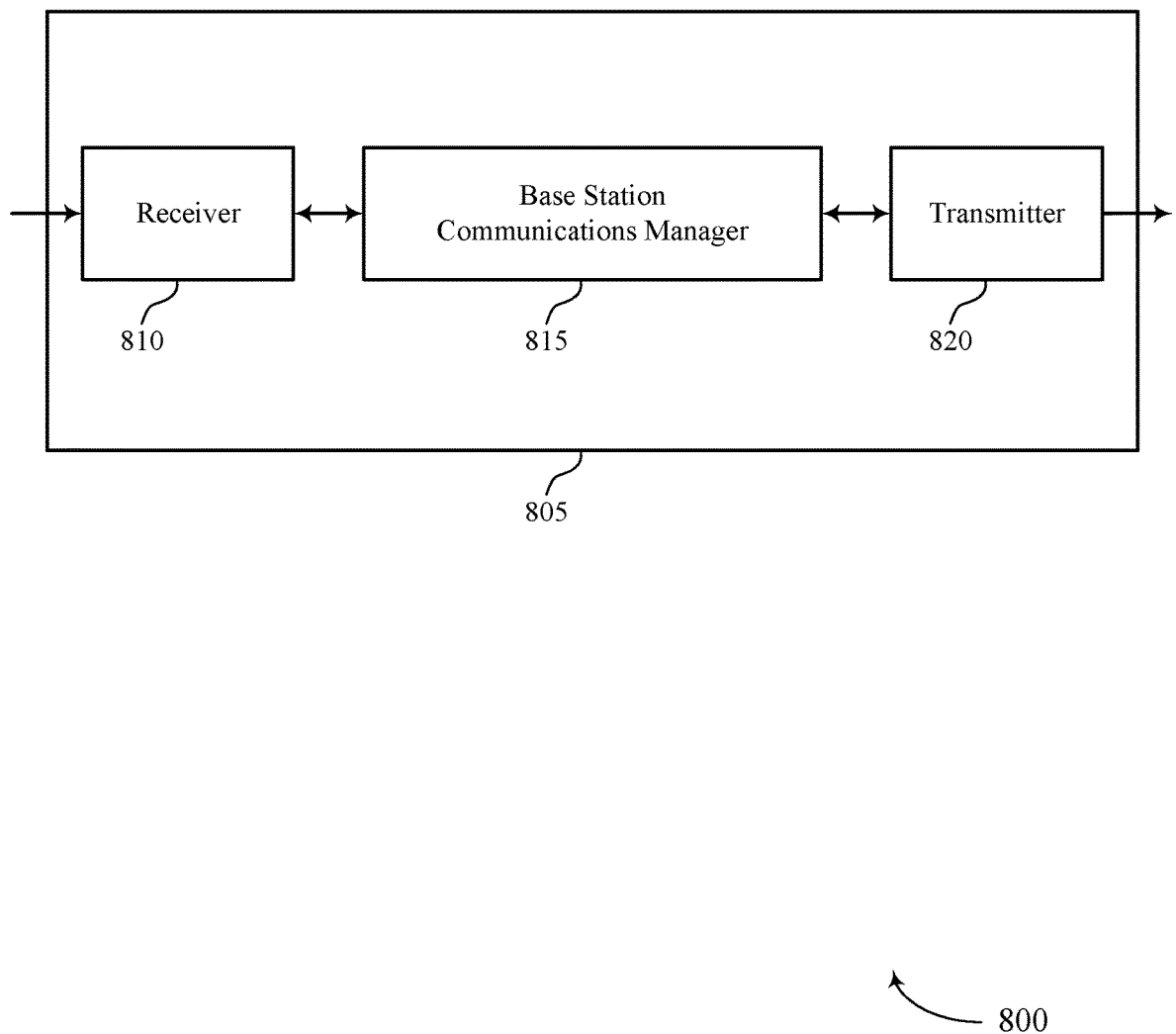
FIGS. 8 and 9 show block diagrams of devices that support idle cell reselection and UE capability signaling in accordance with aspects of the present disclosure.

FIG. 8 shows a block diagram 800 of a device 805 that supports idle cell reselection and user equipment capability signaling in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to idle cell reselection and user equipment capability signaling, etc.). Information may be passed on to other components of the device 805. The receiver 810 may be an example of aspects of the transceiver 1020 described with reference to FIG. 10. The receiver 810 may utilize a single antenna or a set of antennas.

The base station communications manager 815 may receive, from a network entity, a set of UE capabilities associated with a set of available radio access technologies of a set of cells including one or more of a serving cell or a neighboring cell and redirect a UE from a first radio access technology to a second radio access technology of the set of available radio access technologies based on receiving the set of UE capabilities associated with the set of available radio access technologies. The base station communications manager 815 may be an example of aspects of the base station communications manager 1010 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1020 described with reference to FIG. 10. The transmitter 820 may utilize a single antenna or a set of antennas.

Figure 9:
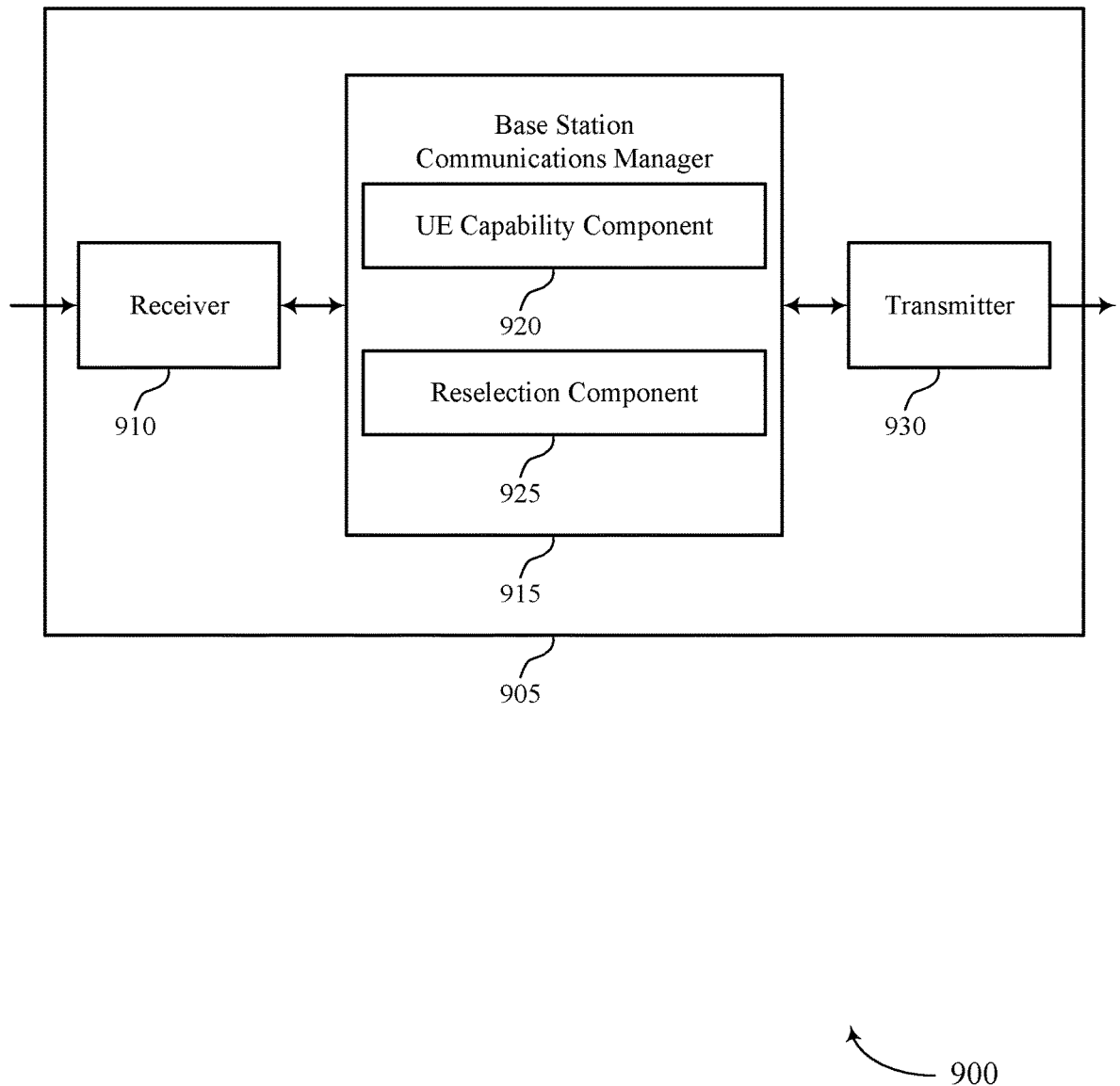

FIG. 9 shows a block diagram 900 of a device 905 that supports idle cell reselection and user equipment capability signaling in accordance with aspects of the present disclosure. The device 905 may be an example of aspects of a device 405, or a base station 105 as described herein. The device 905 may include a receiver 910, a base station communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to idle cell reselection and user equipment capability signaling, etc.). Information may be passed on to other components of the device 905. The receiver 910 may be an example of aspects of the transceiver 1020 described with reference to FIG. 10. The receiver 910 may utilize a single antenna or a set of antennas.

The base station communications manager 915 may be an example of aspects of the UE communications manager 415 as described herein. The base station communications manager 915 may include a UE capability component 920 and a reselection component 925. The base station communications manager 915 may be an example of aspects of the base station communications manager 1010 described herein.

The UE capability component 920 may receive, from a network entity, a set of UE capabilities associated with a set of available radio access technologies of a set of cells including one or more of a serving cell or a neighboring cell. The reselection component 925 may redirect a UE from a first radio access technology to a second radio access technology of the set of available radio access technologies based on receiving the set of UE capabilities associated with the set of available radio access technologies.

The transmitter 930 may transmit signals generated by other components of the device 905. In some examples, the transmitter 930 may be collocated with a receiver 910 in a transceiver module. For example, the transmitter 930 may be an example of aspects of the transceiver 1020 described with reference to FIG. 10. The transmitter 930 may utilize a single antenna or a set of antennas.

Figure 10:
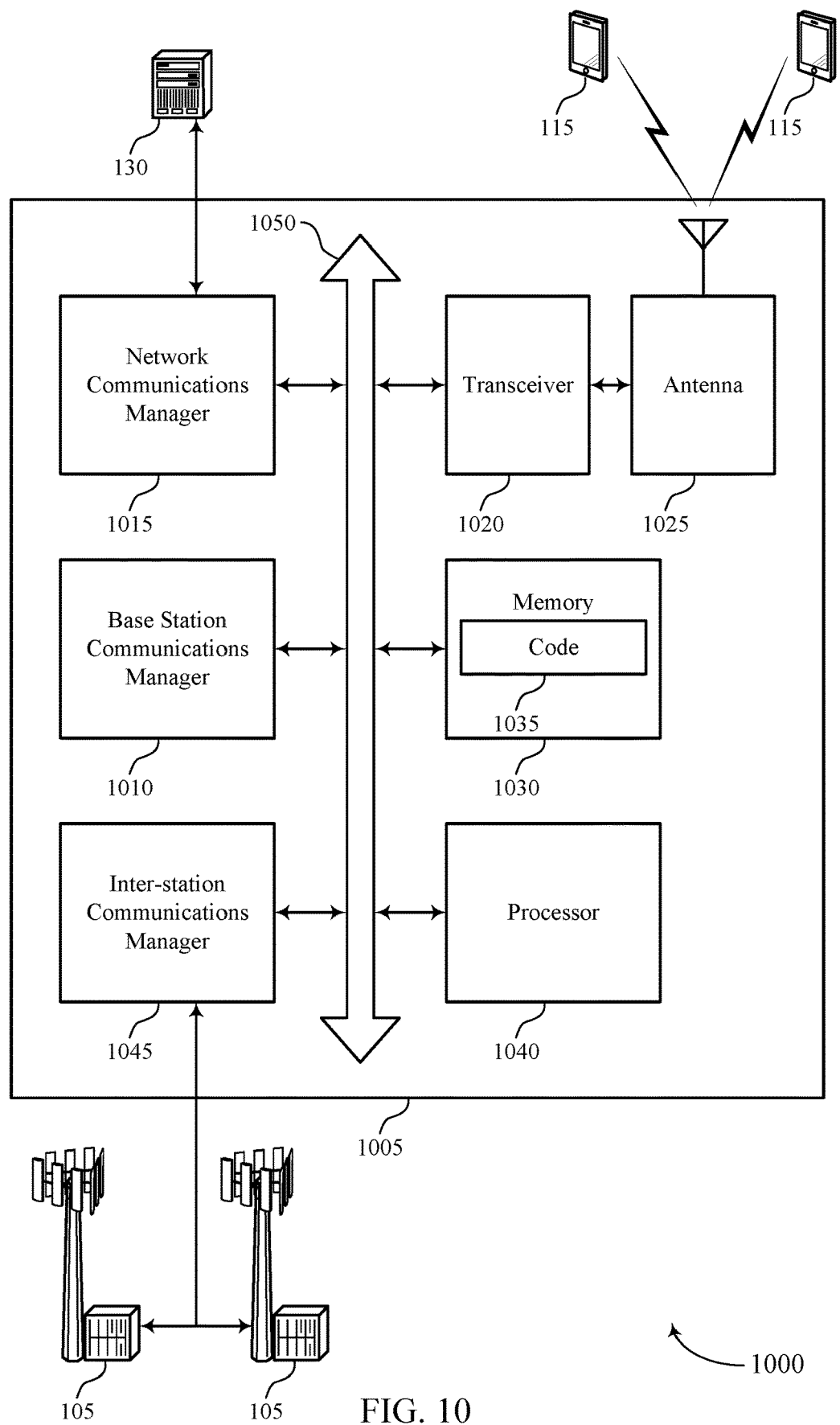
FIG. 10 shows a diagram of a system including a device that supports idle cell reselection and UE capability signaling in accordance with aspects of the present disclosure.

FIG. 10 shows a diagram of a system 1000 including a device 1005 that supports idle cell reselection and user equipment capability signaling in accordance with aspects of the present disclosure. The device 1005 may be an example of or include the components of device 805, device 905, or a base station 105 as described herein. The device 1005 may include components for bi-directional voice and data communications including components for transmitting and receiving communications, including a base station communications manager 1010, a network communications manager 1015, a transceiver 1020, an antenna 1025, memory 1030, a processor 1040, and an inter-station communications manager 1045. These components may be in electronic communication via one or more buses (e.g., bus 1050).

The base station communications manager 1010 may receive, from a network entity, a set of UE capabilities associated with a set of available radio access technologies of a set of cells including one or more of a serving cell or a neighboring cell and redirect a UE from a first radio access technology to a second radio access technology of the set of available radio access technologies based on receiving the set of UE capabilities associated with the set of available radio access technologies.

The network communications manager 1015 may manage communications with the core network (e.g., via one or more wired backhaul links). For example, the network communications manager 1015 may manage the transfer of data communications for client devices, such as one or more UEs 115.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting idle cell reselection and user equipment capability signaling).

The inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communication network technology to provide communication between base stations 105.

It should be noted that the methods described herein describe possible implementations, and that the operations and the steps may be rearranged or otherwise modified and that other implementations are possible. Further, aspects from two or more of the methods may be combined.

Figure 11:
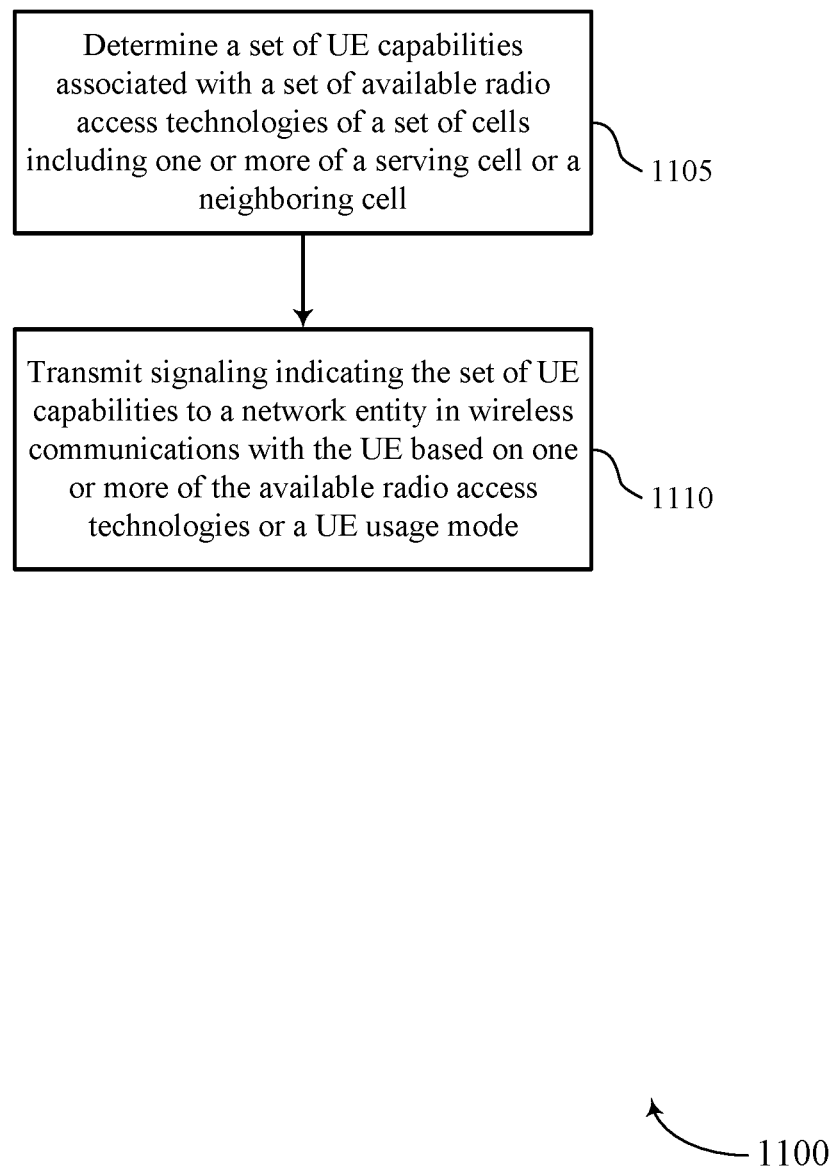
FIGS. 11 through 15 show flowcharts illustrating methods that support idle cell reselection and UE capability signaling in accordance with aspects of the present disclosure.

FIG. 11 shows a flowchart illustrating a method 1100 that supports idle cell reselection and UE capability signaling in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may determine a set of UE capabilities associated with a set of available radio access technologies of a set of cells including one or more of a serving cell or a neighboring cell. The operations of 1105 may be performed according to the methods described herein. In some examples, aspects of the operations of 1105 may be performed by a UE capability component as described with reference to FIGS. 4 through 7.

At 1110, the UE may transmit signaling indicating the set of UE capabilities to a network entity in wireless communications with the UE based on one or more of the set of available radio access technologies or a UE usage mode. The operations of 1110 may be performed according to the methods described herein. In some examples, aspects of the operations of 1110 may be performed by a transmitter as described with reference to FIGS. 4 through 7.

Figure 12:
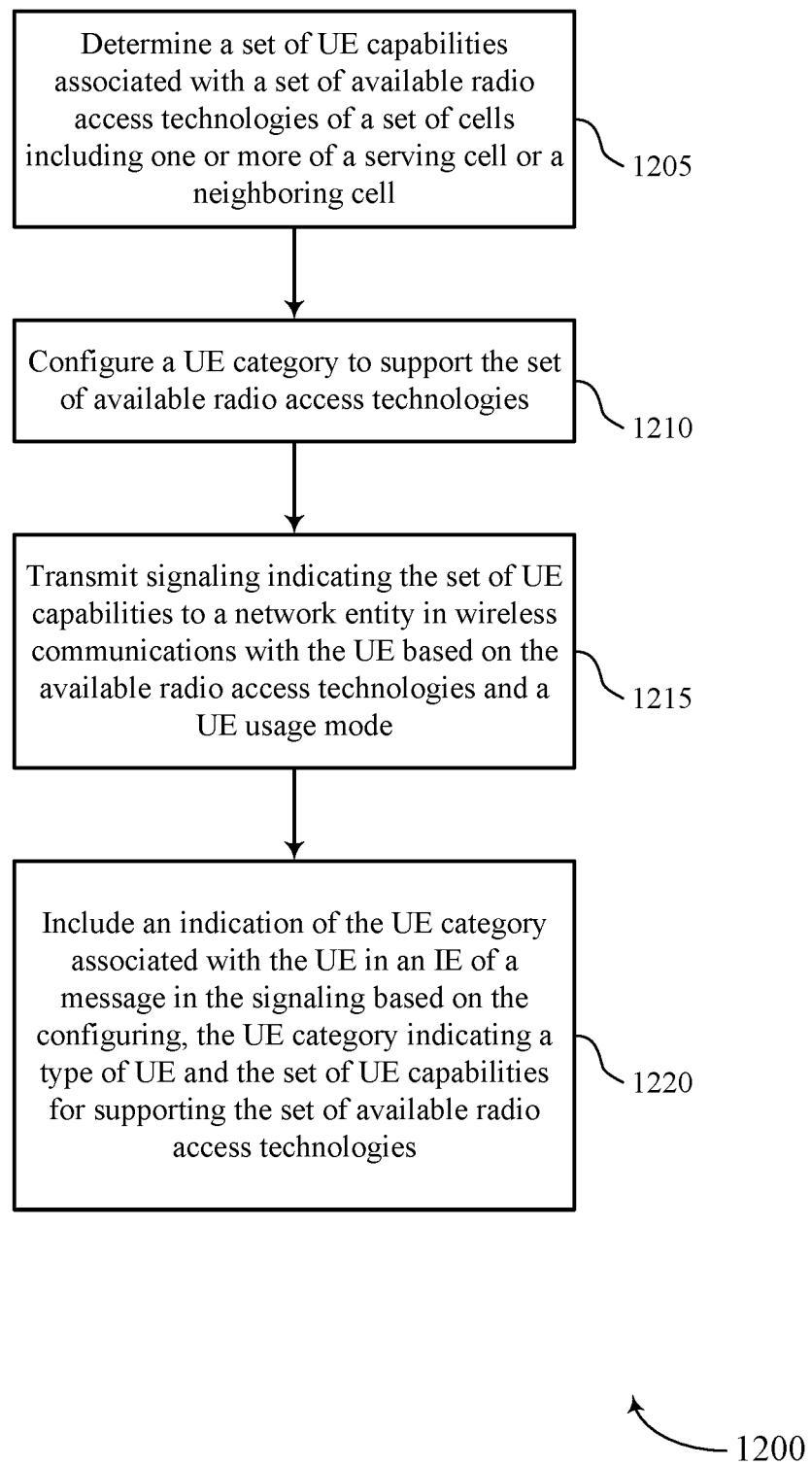

FIG. 12 shows a flowchart illustrating a method 1200 that supports idle cell reselection and UE capability signaling in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may determine a set of UE capabilities associated with a set of available radio access technologies of a set of cells including one or more of a serving cell or a neighboring cell. The operations of 1205 may be performed according to the methods described herein. In some examples, aspects of the operations of 1205 may be performed by a UE capability component as described with reference to FIGS. 4 through 7.

At 1210, the UE may configure a UE category to support the set of available radio access technologies. The operations of 1210 may be performed according to the methods described herein. In some examples, aspects of the operations of 1210 may be performed by a UE category component as described with reference to FIGS. 4 through 7.

At 1215, the UE may transmit signaling indicating the set of UE capabilities to a network entity in wireless communications with the UE based on one or more of the set of available radio access technologies or a UE usage mode. In some examples, the network entity may be the serving cell or a mobility management entity (MME). The operations of 1215 may be performed according to the methods described herein. In some examples, aspects of the operations of 1215 may be performed by a transmitter as described with reference to FIGS. 4 through 7.

At 1220, the UE may include an indication of the UE category associated with the UE in an IE of a message in the signaling based on the configuring, the UE category indicating a type of UE and the set of UE capabilities for supporting the set of available radio access technologies. The operations of 1220 may be performed according to the methods described herein. In some examples, aspects of the operations of 1220 may be performed by a UE category component as described with reference to FIGS. 4 through 7.

Figure 13:
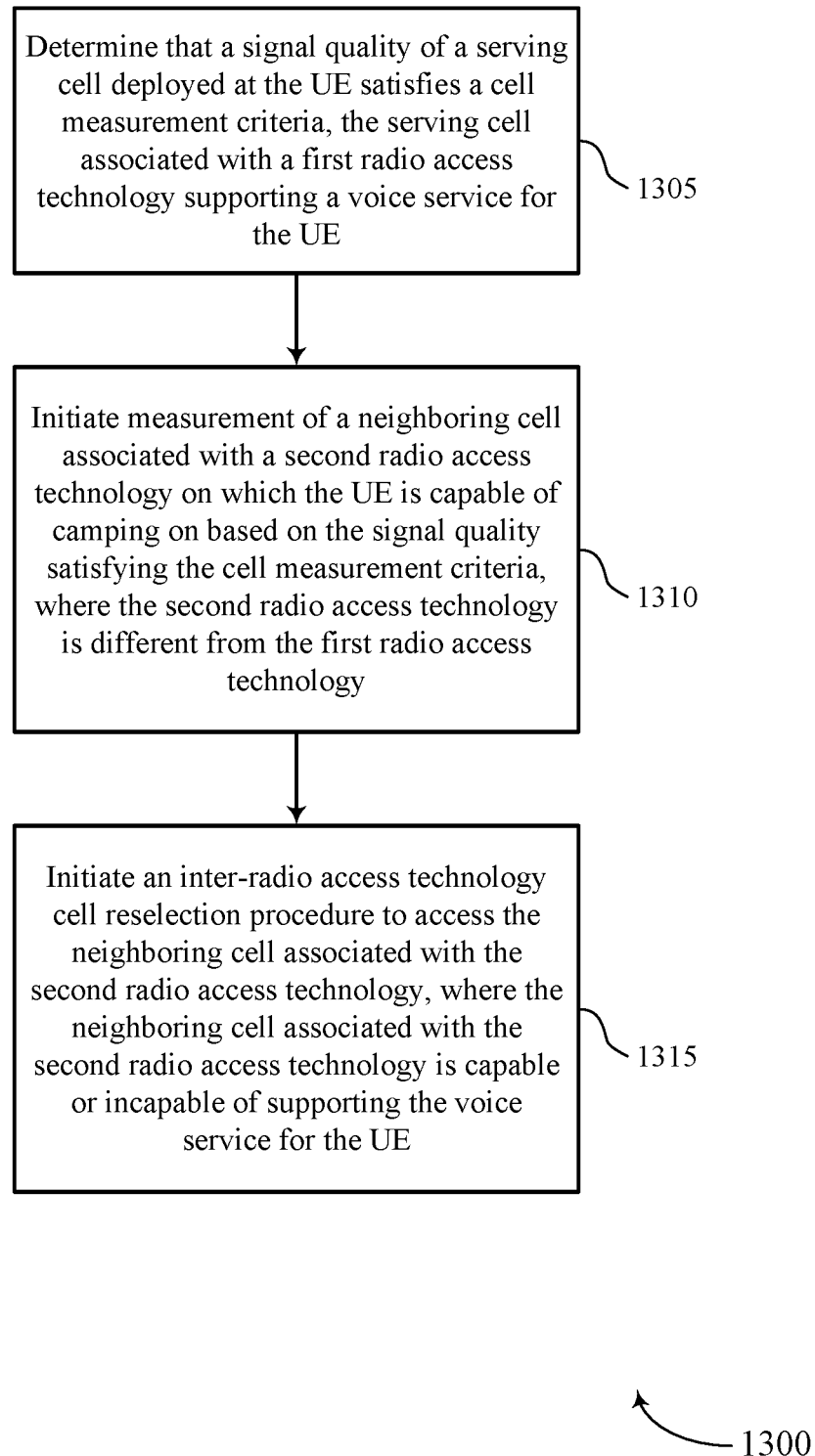

FIG. 13 shows a flowchart illustrating a method 1300 that supports idle cell reselection and UE capability signaling in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may determine that a signal quality of a serving cell deployed at the UE satisfies a cell measurement criterion, the serving cell associated with a first radio access technology supporting a voice service for the UE. The operations of 1305 may be performed according to the methods described herein. In some examples, aspects of the operations of 1305 may be performed by a measurement criteria component as described with reference to FIGS. 4 through 7.

At 1310, the UE may initiate measurement of a neighboring cell associated with a second radio access technology on which the UE is capable of camping on based on the signal quality satisfying the cell measurement criteria, where the second radio access technology is different from the first radio access technology. The operations of 1310 may be performed according to the methods described herein. In some examples, aspects of the operations of 1310 may be performed by a measurement component as described with reference to FIGS. 4 through 7.

At 1315, the UE may initiate an inter-radio access technology cell reselection procedure to access the neighboring cell associated with the second radio access technology, where the neighboring cell associated with the second radio access technology is capable or incapable of supporting the voice service for the UE. The operations of 1315 may be performed according to the methods described herein. In some examples, aspects of the operations of 1315 may be performed by a cell reselection component as described with reference to FIGS. 4 through 7.

Figure 14:
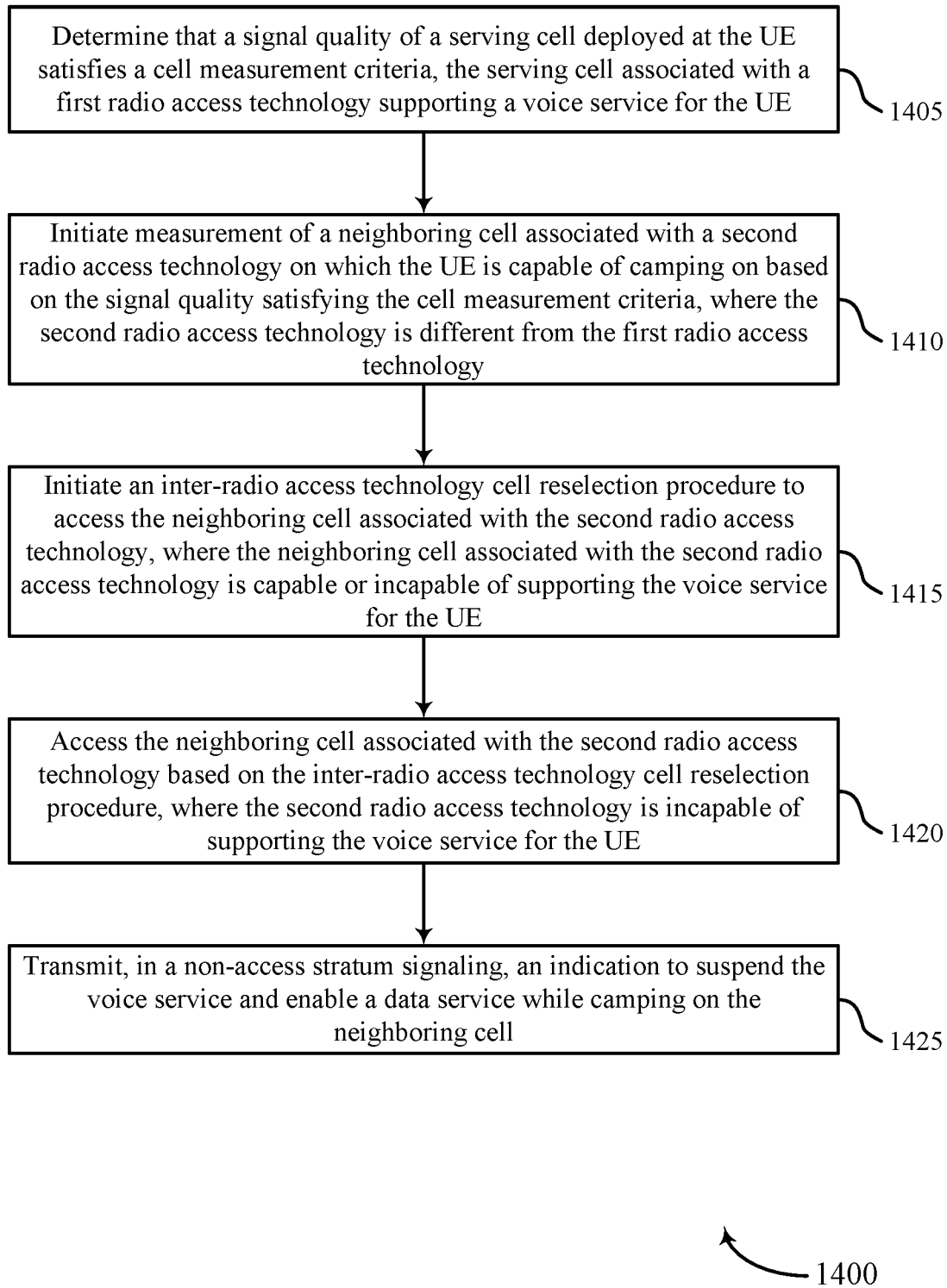

FIG. 14 shows a flowchart illustrating a method 1400 that supports idle cell reselection and UE capability signaling in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may determine that a signal quality of a serving cell deployed at the UE satisfies a cell measurement criterion, the serving cell associated with a first radio access technology supporting a voice service for the UE. The operations of 1405 may be performed according to the methods described herein. In some examples, aspects of the operations of 1405 may be performed by a measurement criteria component as described with reference to FIGS. 4 through 7.

At 1410, the UE may initiate measurement of a neighboring cell associated with a second radio access technology on which the UE is capable of camping on based on the signal quality satisfying the cell measurement criteria, where the second radio access technology is different from the first radio access technology. The operations of 1410 may be performed according to the methods described herein. In some examples, aspects of the operations of 1410 may be performed by a measurement component as described with reference to FIGS. 4 through 7.

At 1415, the UE may initiate an inter-radio access technology cell reselection procedure to access the neighboring cell associated with the second radio access technology, where the neighboring cell associated with the second radio access technology is capable or incapable of supporting the voice service for the UE. The operations of 1415 may be performed according to the methods described herein. In some examples, aspects of the operations of 1415 may be performed by a cell reselection component as described with reference to FIGS. 4 through 7.

At 1420, the UE may access the neighboring cell associated with the second radio access technology based on the inter-radio access technology cell reselection procedure, where the second radio access technology is incapable of supporting the voice service for the UE. The operations of 1420 may be performed according to the methods described herein. In some examples, aspects of the operations of 1420 may be performed by an access component as described with reference to FIGS. 4 through 7.

At 1425, the UE may transmit, in a non-access stratum signaling, an indication to suspend the voice service and enable a data service while camping on the neighboring cell. The operations of 1425 may be performed according to the methods described herein. In some examples, aspects of the operations of 1425 may be performed by a transmitter as described with reference to FIGS. 4 through 7.

Figure 15:
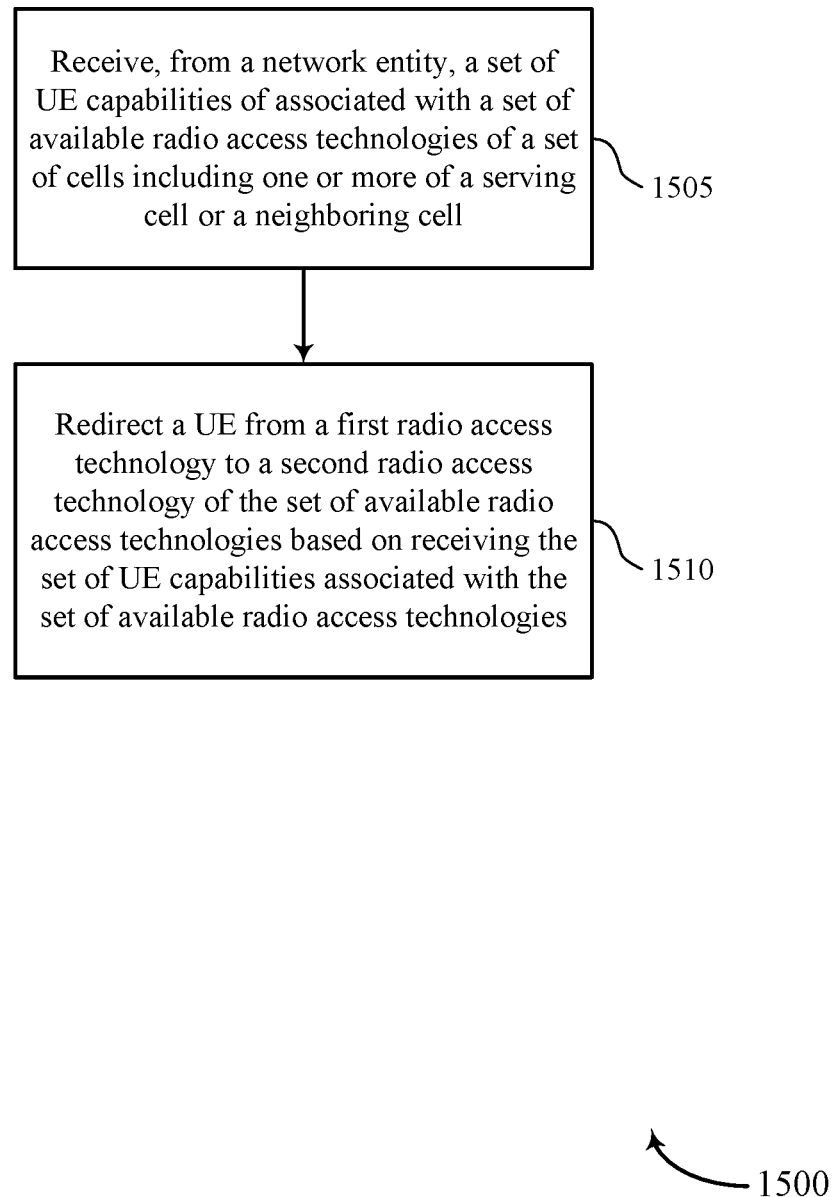

FIG. 15 shows a flowchart illustrating a method 1500 that supports idle cell reselection and user equipment capability signaling in accordance with aspects of the present disclosure. The operations of method 1500 may be implemented by a base station 105 or its components as described herein. For example, the operations of method 1500 may be performed by a base station communications manager as described with reference to FIGS. 8 through 10. In some examples, a base station may execute a set of instructions to control the functional elements of the base station to perform the described functions. Additionally or alternatively, a base station may perform aspects of the described functions using special-purpose hardware.

At 1505, the base station may receive, from a network entity, a set of UE capabilities associated with a set of available radio access technologies of a set of cells including one or more of a serving cell or a neighboring cell. The operations of 1505 may be performed according to the methods described herein. In some examples, aspects of the operations of 1505 may be performed by a UE capability component as described with reference to FIG. 9.

At 1510, the base station may redirect a UE from a first radio access technology to a second radio access technology of the set of available radio access technologies based on receiving the set of UE capabilities associated with the set of available radio access technologies. The operations of 1510 may be performed according to the methods described herein. In some examples, aspects of the operations of 1510 may be performed by a reselection component as described with reference to FIG. 9.

It should be noted that the methods described herein describe possible implementations, and that the operations and the steps may be rearranged or otherwise modified and that other implementations are possible. Further, aspects from two or more of the methods may be combined.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. It is to be understood that these are just some examples of possible implementations, and other examples will be readily apparent to those skilled in the art without departing from the scope of the disclosure. Furthermore, aspects of the following examples may be combined with aspects of other embodiments discussed herein.

Example 1 is a method for wireless communications at a UE that includes determining a set of UE capabilities associated with a set of available radio access technologies of a set of cells including one or more of a serving cell or a neighboring cell, and transmitting signaling indicating the set of UE capabilities to a network entity in wireless communications with the UE based on one or more of the set of available radio access technologies or a UE usage mode.

In Example 2, the method of Example 1 further includes configuring a UE category to support the set of available radio access technologies, and including an indication of the UE category associated with the UE in an IE of a message in the signaling based on the configuring, the UE category indicating a type of UE and the set of UE capabilities for supporting the set of available radio access technologies.

In Example 3, the method of Examples 1 and 2 further includes that the UE category includes a NB-IoT UE, an eMTC UE, a legacy LTE UE, or a GSM and enhanced data rates for a GERAN UE, or a combination thereof.

In Example 4, the method of Examples 1-3 further includes transmitting the signal indicating the set of UE capabilities is further based the UE category.

In Example 5, the method of Examples 1-4 further includes the UE usage mode including a voice centric mode or a data centric mode, or any other mode.

In Example 6, the method of Examples 1-5 further includes identifying a core network type associated with supporting the set of available radio access technologies, where transmitting the signal indicating the set of UE capabilities is further based t on the core network type.

In Example 7, the method of Examples 1-6 further includes identifying, from the set of UE capabilities, a UE capability for a radio access technology associated with the serving cell on which the UE is camping on in an idle state, and including the UE capability for the serving cell in the signal based on one or more of the radio access technology associated with the serving cell or the UE usage mode.

In Example 8, the method of Examples 1-7 further includes identifying, from the set of UE capabilities, a second UE capability for a second radio access technology from the set of available radio access technologies, the second radio access technology associated with the neighboring cell on which the UE is camping on in the idle state, and including the second UE capability for the neighboring cell in the signal to the network entity in wireless communications with the UE based on one or more of the second radio access technology associated with the neighboring cell or the UE usage mode.

In Example 9, the method of Examples 1-8 further includes including, in the signal to the network entity in wireless communications with the UE, other UE capability associated with the set of UE capabilities based on one or more of the UE camping on the serving cell or an associated neighboring cell and the UE usage mode, where the additional UE capability is associated with an additional radio access technology associated with another neighboring cell on which the UE is not camping on.

In Example 10, the method of Examples 1-9 further includes the second radio access technology associated with the neighboring cell is different from the radio access technology associated with the serving cell on which the UE is camping on in the idle state.

In Example 11, the method of Examples 1-10 further includes that the set of available radio access technologies includes NB-IoT, LTE, eMTC, or a GSM and enhanced data rates for GERAN, or a combination thereof.

In Example 12, the method of Examples 1-11 further includes receiving a system information block from the network including a set of parameters to use for an inter-radio access technology cell reselection procedure to switch from camping on the serving cell associated with the radio access technology to a neighboring cell associated with a second radio access technology based on the UE capability, where the radio access technology and the second radio access technology includes NB-IoT, LTE, or eMTC, and performing the inter-radio access technology cell reselection procedure based on the set of parameters received in the system information block.

In Example 13, the method of Examples 1-12 further includes that the system information block includes an indication of one or more of an NB-IoT frequency and a priority of the NB-IoT frequency.

In Example 14, the method of Examples 1-13 further includes that the system information block includes a legacy system information block.

In Example 15, the method of Examples 1-14 further includes updating the set of UE capabilities associated with the set of available radio access technologies based on the inter-radio access technology cell reselection procedure.

In Example 16, the method of Examples 1-15 further includes that the system information block includes one or more of a list of neighboring cells including one or more neighboring cell associated with the second radio access technology or information related to one or more extended coverage capabilities of one or more neighboring cells in the list of neighboring cells.

In Example 17, the method of Examples 1-16 further includes skipping the inter-radio access technology cell reselection procedure associated with the one or more neighboring cells in the list of neighboring cells based on one or more of the one or more neighboring cells not supporting an extended coverage mode.

In Example 18, the method of Examples 1-17 further includes determining that one or more of the serving cell or the neighboring cell includes a (WB-EUTRAN) network or a NB-IoT network and determining that the UE is camping on the WB-EUTRAN network, where the set of UE capabilities includes one or more of WB-EUTRAN capabilities or NB-IoT capabilities, and where transmitting the signaling includes transmitting one or more of the WB-EUTRAN capabilities or the NB-IoT capabilities in the signaling based on the UE camping on the WB-EUTRAN network.

In Example 19, the method of Examples 1-18 further includes determining that one or more of the serving cell or the neighboring cell includes a (WB-EUTRAN) network or a NB-IoT network and determining that the UE is camping on the NB-IoT network, where the set of UE capabilities includes one or more of WB-EUTRAN capabilities or NB-IoT capabilities, and where transmitting the signaling includes refraining from including the WB-EUTRAN capabilities in the signaling and transmitting exclusively the NB-IoT capabilities in the signaling based on the UE camping on the NB-IoT network.

In Example 20, the method of examples 1-19 further includes receiving, from the network entity, a configuration to perform one or more cell measurements related to the set of available radio access technologies of the set of cells including one or more of the serving cell or the neighboring cell based on transmitting the set of UE capabilities, where one or more of the serving cell or the neighboring cell includes a WB-EUTRAN network or a NB-IoT network, and the set of UE capabilities includes one or more of WB-EUTRAN capabilities or NB-IoT capabilities.

In Example 21, the method of examples 1-20 further includes transmitting, to the network entity, a cell measurement report to redirect the UE from the serving cell to the neighboring cell based on performing the one or more cell measurements related to the set of available radio access technologies of the set of cells.

In Example 22, the method of Examples 1-21 further includes identifying a UE configuration to support multiple radio access technologies including the set of available radio access technologies of the set of cell, where the UE configuration includes using separate UE capability contains or separate IEs for different radio access technologies, and determining that one or more of the serving cell or the neighboring network includes a WB-EUTRAN network or a NB-IoT network, and determining that the UE is camping on the WB-UETRAN network and the NB-IoT network, where the set of UE capabilities includes one or more of WB-EUTRAN capabilities or NB-IoT capabilities, and where transmitting the signaling includes transmitting one or more of the WB-EUTRAN capabilities or the NB-IoT capabilities in the signaling based on the UE configuration to support the multiple radio access technologies.

Example 23 is a method for wireless communications that includes determining that a signal quality of a serving cell deployed at the UE satisfies a cell measurement criteria, the serving cell associated with a first radio access technology supporting a voice service for the UE, initiating measurement of a neighboring cell associated with a second radio access technology on which the UE is capable of camping on based on the signal quality satisfying the cell measurement criteria, where the second radio access technology is different from the first radio access technology, and initiating an inter-radio access technology cell reselection procedure to access the neighboring cell associated with the second radio access technology, where the neighboring cell associated with the second radio access technology is capable or incapable of supporting the voice service for the UE.

In Example 24, the method of Example 23 further includes prioritizing the neighboring cell associated with the second radio access technology over a second neighboring cell associated with a third radio access technology based on the second radio access technology capability to support the voice service for the UE and the third radio access technology incapability to support the voice service for the UE.

In Example 25, the method of Examples 23 and 24 further includes configuring a UE capability of the UE, for the third radio access technology that is incapable to support the voice service for the UE, when the UE is unable to identify the second radio access technology capable to support the voice service for the UE.

In Example 26, the method of Examples 23-25 further includes accessing the neighboring cell associated with the second radio access technology based on the inter-radio access technology cell reselection procedure, where the second radio access technology is incapable of supporting the voice service for the UE, and transmitting, in a non-access stratum signaling, an indication to suspend the voice service and enable a data service while camping on the neighboring cell.

In Example 27, the method of Examples 23-26 further includes disabling access stratum capability for neighboring cells incapable of supporting the voice service for the UE when the UE is camping on the serving cell supporting the voice service.

In Example 28, the method of Examples 23-27 further includes the inter-radio access technology cell reselection procedure includes a ranking-based inter-radio access technology cell reselection procedure.

In Example 29, the method of Examples 23-28 further includes the inter-radio access technology cell reselection procedure is performed autonomously based on a network trigger.

In Example 30, the method of Examples 23-29 further includes the first radio access technology and the second radio access technology includes NB-IoT, LTE, or eMTC.

Example 31 is a method for wireless communication at a base station that includes receiving, from the network entity, a set of UE capabilities associated with a set of available radio access technologies of a set of cells including one or more of a serving cell or a neighboring cell and redirecting a UE from a first radio access technology to a second radio access technology of the set of available radio access technologies based on receiving the set of UE capabilities associated with the set of available radio access technologies.

In Example 32, the method of Example 31 further includes that the network entity includes an MME.

In Example 33, the method of Examples 31 and 32 further includes that one or more of the serving cell or the neighboring cell includes a WB-EUTRAN network or a NB-IoT network, and the set of UE capabilities includes one or more of WB-EUTRAN capabilities or NB-IoT capabilities.

In Example 34, the method of Examples 31-33 further includes that the set of available radio access technologies includes NB-IoT, LTE, eMTC, or a combination thereof, and where the second radio access technology is different from the first radio access technology.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a CSG, UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    determining a set of UE capabilities associated with a set of available radio access technologies of a set of cells, the set of cells comprising a serving cell and a neighboring cell, the serving cell corresponding to a first radio access technology and the neighboring cell corresponding to a second radio access technology;
    transmitting signaling indicating the set of UE capabilities to a network entity in wireless communications with the UE based at least in part on a UE usage mode, the UE usage mode indicating a wireless service;
    disabling access stratum capability for a subset of cells of the set of cells lacking support of the wireless service indicated by the UE usage mode; and
    performing a cell reselection procedure while in an idle state based at least in part on a cell of the set of cells supporting the wireless service indicated by the UE usage mode and one or more of the first radio access technology or the second radio access technology.

2. The method of claim 1, further comprising:
    identifying, from the set of UE capabilities, a UE capability for the first radio access technology associated with the serving cell on which the UE is camping on in the idle state; and
    including the UE capability for the serving cell in the signaling based at least in part on one or more of the first radio access technology associated with the serving cell or the UE usage mode.

3. The method of claim 2, further comprising:
    identifying, from the set of UE capabilities, a second UE capability for the second radio access technology from the set of available radio access technologies, the second radio access technology associated with the neighboring cell on which the UE is additionally camping on in the idle state; and
    including the second UE capability for the neighboring cell in the signaling to the network entity in wireless communications with the UE based at least in part on the UE usage mode.

4. The method of claim 3, further comprising:
    including, in the signaling to the network entity in wireless communications with the UE, other UE capabilities associated with the set of UE capabilities based at least in part on one or more of the UE camping on the serving cell or an associated neighboring cell and the UE usage mode,
wherein an additional UE capability is associated with an additional radio access technology associated with another neighboring cell on which the UE is capable of camping.

5. The method of claim 3, wherein the second radio access technology associated with the neighboring cell is different from the first radio access technology associated with the serving cell on which the UE is camping on in the idle state.

6. The method of claim 1, wherein the set of available radio access technologies comprises narrowband Internet-of-Things (NB-IoT), Long Term Evolution (LTE), evolved machine-type-communications (eMTC), or a combination thereof.

7. The method of claim 1, further comprising:
receiving a system information block from the network entity comprising a set of parameters to use for the cell reselection procedure to switch from camping on the serving cell associated with the first radio access technology to the neighboring cell associated with the second radio access technology based at least in part on a UE capability, wherein each of the first radio access technology and the second radio access technology comprises at least one of narrowband Internet-of-Things (NB-IoT), Long Term Evolution (LTE), or evolved machine-type-communications (eMTC), wherein
performing the cell reselection procedure is based at least in part on the set of parameters received in the system information block.

8. The method of claim 7, wherein the system information block comprises an indication of one or more of an NB-IoT frequency or a priority of the NB-IoT frequency.

9. The method of claim 7, further comprising:
updating the set of UE capabilities associated with the set of available radio access technologies based at least in part on the cell reselection procedure.

10. The method of claim 7, wherein the system information block comprises one or more of a list of neighboring cells comprising one or more neighboring cells associated with the second radio access technology or information related to one or more extended coverage capabilities of one or more neighboring cells in the list of neighboring cells.

11. The method of claim 10, further comprising:
skipping the cell reselection procedure associated with the one or more neighboring cells in the list of neighboring cells based at least in part on one or more of the one or more neighboring cells not supporting an extended coverage mode.

12. The method of claim 1, further comprising:
determining that one or more of the serving cell or the neighboring cell comprises a wideband evolved universal terrestrial radio access network (WB-EUTRAN) network or a narrowband Internet-of-Things (NB-IoT) network; and
determining that the UE is camping on the WB-EUTRAN network, wherein the set of UE capabilities comprises one or more of WB-EUTRAN capabilities or NB-IoT capabilities, and wherein transmitting the signaling comprises:
transmitting one or more of the WB-EUTRAN capabilities or the NB-IoT capabilities in the signaling based at least in part on the UE camping on the WB-EUTRAN network.

13. The method of claim 1, further comprising:
determining that one or more of the serving cell or the neighboring cell comprises a wideband evolved universal terrestrial radio access network (WB-EUTRAN) network or a narrowband Internet-of-Things (NB-IoT) network; and
determining that the UE is camping on the NB-IoT network, wherein the set of UE capabilities comprises one or more of WB-EUTRAN capabilities or NB-IoT capabilities, and wherein transmitting the signaling comprises:
refraining from including the WB-EUTRAN capabilities in the signaling; and
transmitting exclusively the NB-IoT capabilities in the signaling based at least in part on the UE camping on the NB-IoT network.

14. The method of claim 1, further comprising:
receiving, from the network entity, a configuration to perform one or more cell measurements related to the set of available radio access technologies of the set of cells comprising one or more of the serving cell or the neighboring cell based at least in part on transmitting the set of UE capabilities,
wherein one or more of the serving cell or the neighboring cell comprises a wideband evolved universal terrestrial radio access network (WB-EUTRAN) network or a narrowband Internet-of-Things (NB-IoT) network, and the set of UE capabilities comprises one or more of WB-EUTRAN capabilities or NB-IoT capabilities.

15. The method of claim 14, further comprising:
transmitting, to the network entity, a cell measurement report to redirect the UE from the serving cell to the neighboring cell based at least in part on performing the one or more cell measurements related to the set of available radio access technologies of the set of cells.

16. The method of claim 1, further comprising:
identifying a UE configuration to support multiple radio access technologies including the set of available radio access technologies of the set of cells, wherein the UE configuration comprises using separate UE capability contains or separate information elements (IEs) for different radio access technologies;
determining that one or more of the serving cell or the neighboring cell comprises a wideband evolved universal terrestrial radio access network (WB-EUTRAN) network or a narrowband Internet-of-Things (NB-IoT) network; and
determining that the UE is camping on the WB-EUTRAN network and the NB-IOT network, wherein the set of UE capabilities comprises one or more of WB-EUTRAN capabilities or NB-IoT capabilities, and wherein transmitting the signaling comprises:
transmitting one or more of the WB-EUTRAN capabilities or the NB-IoT capabilities in the signaling based at least in part on the UE configuration to support the multiple radio access technologies.

17. A method for wireless communications at a base station, comprising:
receiving, from a network entity, a set of user equipment (UE) capabilities associated with a set of available radio access technologies of a set of cells comprising a serving cell and a neighboring cell, the serving cell corresponding to a first radio access technology and the neighboring cell corresponding to a second radio access technology; and
redirecting a UE from the first radio access technology to the second radio access technology of the set of available radio access technologies based at least in part on receiving the set of UE capabilities associated with the set of available radio access technologies, the second radio access technology supporting a wireless service associated with a UE usage mode of the UE, and an access stratum capability of a cell associated with the second radio access technology being enabled.

18. The method of claim 17, wherein the network entity comprises a mobility management entity (MME).

19. The method of claim 17, wherein one or more of the serving cell or the neighboring cell comprises a wideband evolved universal terrestrial radio access network (WB-EUTRAN) network or a narrowband Internet-of-Things (NB-IoT) network, and the set of UE capabilities comprises one or more of WB-EUTRAN capabilities or NB-IoT capabilities.

20. The method of claim 17, wherein the set of available radio access technologies comprises narrowband Internet-of-Things (NB-IoT), Long Term Evolution (LTE), evolved machine-type-communications (eMTC), or a combination thereof, and wherein the second radio access technology is different from the first radio access technology.

21. An apparatus for wireless communications, comprising:
a processor,
memory in electronic communication with the processor; and
instructions stored in the memory and executable by the processor to cause the apparatus to:
determine a set of apparatus capabilities associated with a set of available radio access technologies of a set of cells comprising a serving cell and a neighboring cell, the serving cell corresponding to a first radio access technology and the neighboring cell corresponding to a second radio access technology;
transmit signaling indicating the set of apparatus capabilities to a network entity in wireless communications with the apparatus based at least in part on an apparatus usage mode, the apparatus usage mode corresponding to a wireless service supported by one or more cells of the set of cells;
disable access stratum capability for a subset of cells of the set of cells lacking support of the wireless service indicated by the apparatus usage mode; and
perform a cell reselection procedure while in an idle state based at least in part on the apparatus usage mode and one or more of the first radio access technology or the second radio access technology, wherein the cell reselection procedure comprises switching from camping on the serving cell to a cell of the set of cells that supports the wireless service corresponding to the apparatus usage mode.

* * * * *